United States Patent [19]
Miller et al.

[11] Patent Number: 5,535,323
[45] Date of Patent: Jul. 9, 1996

[54] METHOD OF AND SYSTEM FOR DISPLAYING CONTEXT SENSITIVE AND APPLICATION INDEPENDENT HELP INFORMATION

[75] Inventors: James S. Miller, Arlington, Mass.; Jagadeesan Ganapathi, Nashua, N.H.

[73] Assignee: Digital Equipment Corporation, Maynard, Mass.

[21] Appl. No.: 513,143

[22] Filed: Aug. 9, 1995

Related U.S. Application Data

[63] Continuation of Ser. No. 906,233, Jun. 29, 1992, abandoned.

[51] Int. Cl.$^6$ ..................................................... G06F 3/00
[52] U.S. Cl. ............................................. 395/155; 395/156
[58] Field of Search ..................................... 395/155–161, 395/700; 345/117–120, 146; 434/118

[56] References Cited

U.S. PATENT DOCUMENTS

| | | | |
|---|---|---|---|
| 4,648,062 | 3/1987 | Johnson et al. | 395/155 X |
| 4,789,962 | 12/1988 | Berry et al. | 395/157 X |
| 4,899,276 | 2/1990 | Stadler | 395/155 X |
| 4,964,077 | 10/1990 | Eisen et al. | 395/155 X |
| 4,970,678 | 11/1990 | Sladowski et al. | 395/155 X |
| 4,992,922 | 2/1991 | Brooks et al. | 395/155 X |
| 5,029,113 | 7/1991 | Miyoski et al. | 395/161 X |
| 5,122,972 | 6/1992 | Richards et al. | 395/157 X |
| 5,157,768 | 10/1992 | Hoeber et al. | 395/161 X |
| 5,175,812 | 12/1992 | Krieger | 395/155 X |
| 5,287,448 | 2/1994 | Nicol et al. | 395/159 |
| 5,327,529 | 7/1994 | Fults et al. | 395/155 |

OTHER PUBLICATIONS

Advanced Interface Design Guide, IBM, Jun. 1989, pp. 23–27.

The Worksheet Utilites, Funk Software, Inc., 1987, pp. 10–20, 48–60.

Microsoft Works Reference, Microsoft Corp., 1989, pp. 1–27, 32–36.

Johnson et al, IBM Tech. Discl. Bull., v. 27, n. 10B, Mar. 1985, pp. 6126, 6128.

Berry et al, IBM Tech. Discl. Bull., v. 27, n. 10B, Mar. 1985, p. 6127.

IBM Tech. Discl. Bull., v. 29, n. 1, Jun. 1986, pp. 291–292.

Wiederhold, "File Organization for Database Design", McGraw–Hill, 1987, pp. 1–20.

Macintosh Human Interface Guidlines, Apple, Corp., 1992, pp. 313–325.

Whittaker, "dBase III", Brown Publ., 1985, pp. 3–4.

McKita, "Online Documentation and Hypermedia: Designing Learnability into the Product", IEEE, 1988, pp. 301–305.

Microsoft Word, 1991, screen pp. 1–4.

*Primary Examiner*—Mark R. Powell
*Assistant Examiner*—John E. Breene
*Attorney, Agent, or Firm*—Arnold, White & Durkee

[57] ABSTRACT

A method or process is disclosed for displaying help information to users of computer programs. The process is application independent and provides context sensitive help information for a particular subject selected by the user. The help information is customized to the needs of an individual user. The process also automatically provides help information for the particular subject matter selected by the user from other contexts without having the user select the other contexts or even know about the existence of the other contexts. The help information is displayed to the user without interrupting the application currently being run by the user.

8 Claims, 4 Drawing Sheets

METHOD OF AND SYSTEM FOR DISPLAYING CONTEXT SENSITIVE AND APPLICATION INDEPENDENT HELP INFORMATION

This application is a continuation of application Ser. No. 07/906,233, filed Jun. 29, 1992, now abandoned.

FIELD OF THE INVENTION

The present invention relates generally to systems for providing informational assistance to users of computer programs. More specifically, the preferred embodiment of the present invention is a process or program that is application independent and provides context sensitive informational assistance which is tailored to the needs of individual users and automatically provides other context browsing without the user having to know about the existence of the other contexts.

BACKGROUND OF THE INVENTION

Most currently available software packages include dedicated help capabilities that provide users of the program with on-screen information on demand relating to the operation of the program. These dedicated help facilities are inseparably associated with a specific software package. These dedicated or "canned" help facilities are not tailored or customized to meet the needs of a specific customer or user of the software package, but rather, contain generic information about the operation of the software in an effort to assist the user with areas of anticipated difficulty or commonly asked questions.

Some known on-line help facilities allow the user to customize the information content of the information displayed. But because these on-line help facilities are built into an associated software package, they only provide assistance in a single "context." That is, these on-line help facilities are limited because they do not cross application boundaries. Of course, specific help may be provided within the application, such as the widget specific help in DECwindows, which is currently sold by the assignee of the present invention, Digital Equipment Corporation. However, no known system permits users to obtain help information in both an active or chosen context and in other non-active contexts that are not necessarily related to the application being run by the user when help is requested. Whether the user is aware or unaware of the existence of other contexts when help is requested, known help systems do not automatically provide the user with other context browsing.

Another shortcoming of presently available help facilities has manifested itself with the growing popularity of electronic mail ("E-mail"). Members of a group working with E-mail often face the problem of accessing appropriate information pertaining to a wide variety of tasks. In known "E-mail" applications such as the VAX/VMS™ mail program sold by Digital Equipment Corporation, it is possible to seek external help by invoking an external application. However, at the time of invoking the external application, the user temporarily has to escape into a new context, thus suspending the original application (VMS Mail™). Thus, the user cannot seek external help while staying in the current application context at all times.

Various forms of help facilities are also provided by known application-independent keyboard macros, file name and key word completion mechanisms, and an application called "SuperBoomerang" specifically written for the Macintosh™ computer.

Keyboard macros free the user from the burden of having to remember appropriate information, as well as reduce the amount of typing, by compressing user input. However, keyboard macros are either not context sensitive or not application independent. EMACS (a text editor) has context sensitive keyboard macros, but they are embedded in the single application. Several PC applications provide keyboard macros across applications, but they are not sensitive to the application to which they are sending the expanded keystrokes. Completion systems such as those in TOPS-20 and EMACS operate in a manner similar, and have precisely the same limitations.

"SuperBoomerang" is an application that runs as a standalone module. It is never directly used by the end-user, and in a sense it performs as an "application's application". "SuperBoomerang" provides automatic assistance when the user selects the "Open" command of any end-user application, by presenting a list of application-relevant files for the user's selection. Thus, the end-user is freed from the burden of having to remember and input the relevant file name(s). However, "SuperBoomerang" is not context sensitive and does not provide any capabilities similar to other context browsing.

A help facility that operates independently with respect to application programs running on a host computer system is desirable. Similarly desirable is a help facility that provides context sensitive help information which is customized to individual customer or user needs and that provides other context browsing without the user having to choose or even know about the existence of other contexts.

SUMMARY OF THE INVENTION

The present invention is a help facility process which displays application independent, context-sensitive, on demand, customizable information on screen to the user on a subject of interest chosen by the user. In the preferred embodiment, the method operates in a windowing environment which provides a means of marking and pasting selections. Examples of such environments are X-Windows™ (and all its variants: Motif™, DECWindows, etc.), Microsoft Windows™, and the Macintosh™ Operating System. The process or program of the present invention is application independent because it provides help facilities external to the application and is context sensitive because it provides appropriate customizable help information on a selected subject of interest specific to a context selected by the user. The present invention also automatically provides help information from other applications on a subject of interest selected by the user, thus enabling the user to perform other context browsing.

A user of the process of the present invention invokes the program by depressing a key or clicking a mouse or some combination thereof. The user also selects a subject on which to receive help, the active selection. The selection is made relative to a context, which qualifies the help being sought. In other words, the user seeks help with regard to a particular context. A text string or similar means, referred to as a trigger, is used to identify the current or active context. However, the application from which help is sought is not limited to the same application that the user is operating in when the selection is made and, accordingly, the user may browse through help information from other applications.

A context file contains customizable help information for a specific context and specific subjects. Programmers of the system customize the information displayed to system users in response to specific user selections. A context pattern is a string that is either exact or contains wild cards. A directory file specifies a list of mappings between a context pattern and a context name. The directory file is searched for a context pattern corresponding to the active context and the corresponding context file is searched for help information corresponding to the active selection in order to construct a help menu for the active context. In addition, the directory file is searched for context patterns that do not correspond to the active context, referred to as non-active contexts, and the corresponding context files are searched for help information corresponding to the active selection, in order to construct a help menu for the non-active contexts. System users are first provided with a help information menu constructed in response to the combination of the active context and the active selection. If no help information menu according to the active context and active selection is present, or if no item from the active context help menu is selected, the user is also provided with a help information menu constructed in accord with the non-active contexts and the active selection. Thus, a user can perform context browsing and obtain help information from the other contexts without performing multiple invocations of the applications associated with the other contexts and without even knowing that the other applications exist.

BRIEF DESCRIPTION OF THE DRAWINGS

The advantages of the present invention will become apparent upon reading the following detailed description and upon reference to the accompanying drawings, in which.

Figure 1:
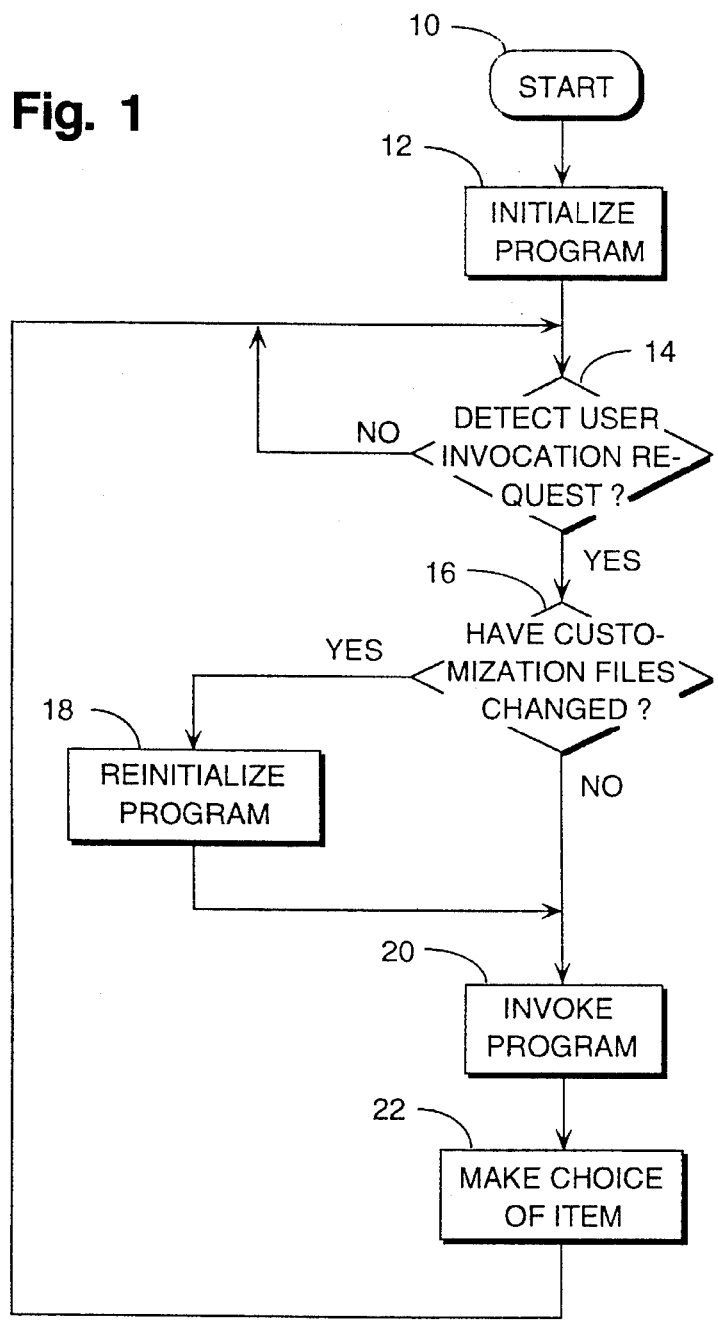
FIG. 1 is a flow chart showing the overall operation of a preferred software embodiment of the method of the present invention.

While the invention is susceptible to various modifications and alternative forms, specific embodiments thereof have been shown by way of example in the drawings and will be described in detail herein. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE INVENTION

A single computer-based tool can be used in different contexts to accomplish different tasks. Thus, there is a need for help information based on the "context" in which a tool is used, rather than just the tool itself. Because this help information is based on the use to which the tool is put, the help facility should be external to the tool itself.

A simple analogy is helpful in clarifying this concept: a hammer can be indiscriminately used for pounding a nail or opening a paint can — yet the way the hammer is used differs for these contexts. A handyman's guidebook that allows the handyman to look up information about the use of the hammer in these two distinctly different contexts performs a function analogous to the function performed by the present invention for a computer user. That is, the present invention displays help information requested by the user, through selection and invocation, regarding the use of computer tools in a variety of contexts.

All products needing a modular customizable help facility can use the method of the present invention, which displays application independent, context-sensitive, on demand, customizable information on screen to the user. The present invention allows a user of a computer software package to make a selection relating to stored information about the software package and the work flows associated therewith. In the preferred embodiment, the user makes a selection using an interactive input device, such as a mouse or key. As will be apparent to the skilled in the field, selections may also be made by invoking a program. The selection can be a text string or other representation, such as an image or graphical object of subjects of interest and is communicated to a host computer. For example, the selection may be made under Motif (or XUI), using click and drag or by double clicking MB1 (mouse button-1).

An essential feature of the present invention is that user selections of subject matters for which help information is sought are made within the context of an application. In the present description of the preferred embodiment, a context is a pair of items that specifically identify various predetermined applications on the host computer: a context pattern and a context file. The context pattern is represented using the syntax for regular expressions. In a preferred embodiment of the invention, a context name is an exact text string. Context help files containing unique help information for each context are created by a programmer and/or other users and stored at the host computer. The manner in which the help information is created and subsequently stored is well-known to those of ordinary skill. The appropriate context help file is identified based on the context for which the user requests information. The context help file is preferably an ASCII file that contains Tag and Menu definitions. The help file has the same name as the associated context and has a specific predetermined extension (for example, .TL).

The directory file preferably contains pairs consisting of (a) a regular expression and (b) a context name. At invocation, the title of the window from which the program was invoked is matched against the regular expressions to determine a context name. The directory file is stored on a mass storage device associated with a host computer. The relationship of the directory file to the present invention is fully described hereinafter. The trigger is the string that is used to determine the active or current context (for example, the window title).

In operation, a user invokes the present invention by pressing the appropriate keyboard key and/or mouse button combination and makes a selection from a specific window of the running windowing program. The title string of the window is used as the trigger to identify the current or active context. The trigger is matched against all the context patterns in the directory file until a match is found. The corresponding context and name is the desired context (with a unique extension, such as .TL is the desired help file for that context. Next, the appropriate context file is searched for the active selection (a tag) and the corresponding menu is presented to the user as help for the specific selection. In a similar manner and at the same time, all the context patterns in the directory file that do not match the trigger are used to construct a non-active context help menu. This non-active context help menu is automatically made available to the user for context browsing. Thus the user does not have to invoke the applications related to the non-active contexts or even know if other applications exist at the host computer. The construction of the non-active context help menu is completely transparent to the user.

The present invention combines three important features. These features have never been successfully combined in previous systems. First, the invention provides application independence. Second, the invention supports user customizable contexts or, in other words, is context sensitive. Third, the user can context browse, across applications without selecting or even knowing about the existence of the other applications.

The present invention is application independent since it runs on a mainframe or desk top as an independent module and provides help facilities external to the application. Since the process of the present invention is application independent, it is essentially a disembodied help server. A program embodying the method of the invention is flee-standing and does not have to be integrated into another application to be useful.

The present invention is context sensitive since it supports user-customizable help information specific to the context and selection made by the user. The user modifies the context by modifying the trigger or the context pattern in the directory file. By changing the trigger or the context pattern, the user gains access to any context supported by the host computer. This feature provides the user with flexibility in obtaining help for different contexts. Information supplied by the program is obtained from user-customizable text files. Programmers and/or end users build the contents of these text files using commonly known techniques (such as a word processor or text editor) that are not an essential feature of the invention. Each user can specify to a programmer the way in which applications are used to accomplish tasks. The programmer customizes the help needed for those tasks by tailoring available help information to the user's needs. Thus, using the present invention, software programmers and/or other users customize the help information available with regard to specific application programs and the specific needs of individual users or groups of users.

Third, the invention allows the user to browse and access help information from all contexts despite an initial determination of a specific initial context. Accordingly, using the present invention the user can browse and access information pertaining to various contexts, including contexts other than the active or current context. This feature enables the user to avoid invoking applications associated with other contexts each time information from one of these other context is requested. The help information pertaining to non-active contexts is automatically constructed and provided to the user without having the user even know that such non-active contexts exist in the directory file of the host computer.

It will be appreciated by those of ordinary skill in the field that the method of the present invention may be implemented in both software, which runs on a host system, and hardware embodiments, or a combination of software and hardware. The essential features of the present invention are described herein with respect to a software embodiment. The conversion of implementation of the method of the present invention from software to hardware is well-known to the skilled in the The method of the present invention has three major operations: initialization, invocation, and choice. During initialization it reads in customization information (from user provided text files) that will be used to determine, at each invocation, what context is active and, for each context, what information (help items and associated data) is available. Upon invocation, the active context is determined and combined with the current selection (available from the window system) to choose a menu of help items that is then presented to the user for choice. At the same time, the non-active contexts are determined and combined with the current selection to choose a menu of non-active context help items that is also presented to the user for choice. At choice time, the user has three options: choose one of the active context help items (in which case the present invention makes the associated help text available, via the window system, for pasting into an application or performs a specified action); browse the non-active help items; or make another selection and reinvoke the program.

An example illustrates some of the benefits of the present invention. In this example, the invention frees the user from the twin burdens of remembering and typing context-dependent information.

A software program embodying the method of the present invention is started when a user begins a session. The user starts an electronic mail program to read new mail and decides to forward the first message to several members of a newly formed project team. In the send window of the electronic mail program, the user highlights a "To:" prompt and then invokes the program embodying the present invention, which detects the context — sending mail. The highlighted "To" indicates the user's selection for help creating the "To:" list. The present invention operates to provide the user with a list of project teams, which has been entered into the appropriate help file by a programmer. This information is context-sensitive, but the user does not need to remember the details associated with creating a "To:" list. The user chooses the correct project team and is then able to "paste" (rather than type) the names of the individual team members (more information the user need not remember) into the outgoing message. The user then edits this list using the normal facilities of the mail program. Having filled in the "To:" field in the send window, the user seeks help about the "subject" field in a similar fashion. However, the current context may not contain an appropriate help item for the subject field, as this can be specific to the project being discussed. The user now wishes to explore non-active context help files, using other contexts browsing. The present invention has access to specific help files for each project with which the user is associated. These project specific help files contain information about relevant subjects. Thus, the user can pull up the help menu associated with the "subject" field, for a required project. The user identifies an item (topic) in the menu as his choice. This information can then be pasted as in the previous case (To). The user is able to accomplish all of this without having to reinvoke the "program" in a different context, or without interrupting the current context — that of sending mail.

Figure 2:
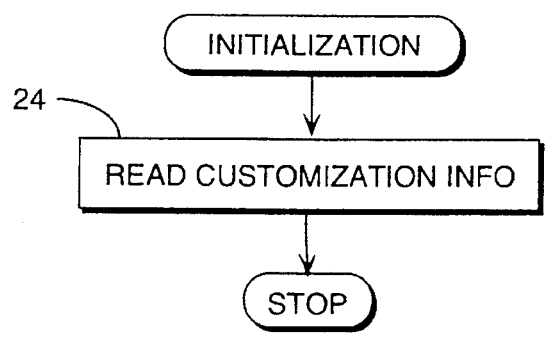
FIG. 2 is a flow chart showing the steps taken for initialization of a preferred soft embodiment of the method of the present invention.

Referring to the drawings, FIG. 1 is a flow chart showing the overall operation of a preferred software embodiment of the method of the present invention. At step 10, the program is started. Program initialization, which is fully described hereinafter with reference to FIG. 2 is performed at step 12. Initialization involves loading the program with customization information provided by a programmer or a user of the program.

At step 14, the program waits to be notified by the host system about an invocation request that has been made by the system user. If no invocation request has been made, the waiting continues until such a request is made. It is contemplated that the present invention can be invoked via a mouse button, keystroke or any conventional means. Invocation of the present invention is fully described with reference to FIG. 3.

After detecting an invocation request, the program determines whether the contents of customization files (such as the directory file or help files) have been modified by the user prior to invocation (step 16). If the contents of the customization files have been changed, the program is re-initialized (step 18). The program employs well-known techniques to identify whether the appropriate customization file names have been modified. The specific details of how information is read by the program are not essential features of the present invention and are well known to those skilled in the field. If the contents of the customization files remains the same, invocation of the program proceeds, as shown in step 20. Finally, at step 22, the program user makes a choice of help menu items for which information is desired. This process is fully described with reference to FIG. 4.

FIG. 2 is a flow chart showing the steps taken for initialization of a preferred software embodiment of the method of the present invention. A program embodying the method of the present invention preferably initializes as part of session initialization when the user logs into the host computer. As shown in step 24, the program reads customization information that will be supplied in response to the request by the user at invocation. Initialization is performed after the program is started (FIG. 1, step 12) or if the user has altered the customization files for which information is requested (FIG. 1, step 18). The appropriate customization information is read by a program according to any conventional method in response to initialization. After initialization is completed, program execution continues from the point from which the initialization routine was called.

Figure 3:
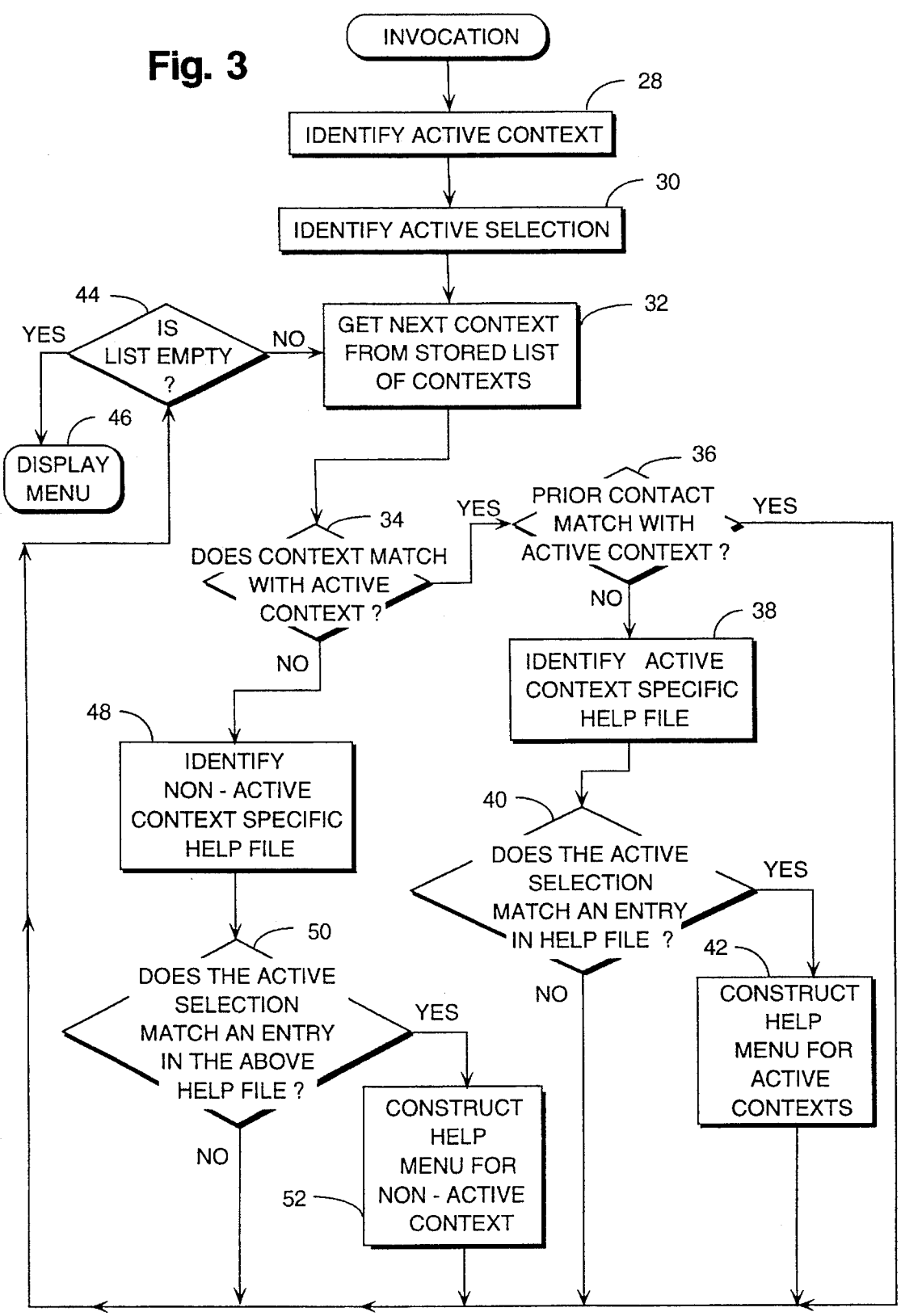
FIG. 3 is a flow chart showing the steps taken for invocation of a preferred software embodiment of the method of the present invention.

FIG. 3 is a flow chart showing the steps taken for invocation of a preferred software embodiment of the method of the present invention.

Upon invocation of the present invention, the active or current context is identified (step 28). As previously noted, the identity of the context is related to the interaction of the program of the present invention with a windowing program also running on the host system. In the preferred embodiment of the invention, the identity of the current context is defined to be the window title. Any other method for identifying the context can be used as will be understood by those of ordinary skill in the field. The mechanics of the interface of the windowing program with the program of the present invention is not an essential feature of the invention and, accordingly, are not discussed in detail herein. The skilled in the field will appreciate that any known method of obtaining the window title from the windows program may be employed. One method of obtaining the window title is to query the window system.

Upon identification of the active context, the present invention identifies the active selection for which the user seeks information at step 30. The user of the system makes the selection in the windowing system using any well-known technique such as click and drag or by double clicking MB1. One method of identifying the selection that can be employed by the program is to query the windowing program to determine the user input, which may take the form of a text string or the like. In general terms, the user selection corresponds to the subject for which the user is seeking help.

The selection that the user currently seeks information about is referred to as the "primary selection." As previously noted, an essential feature of the present method is that it allows other contexts browsing. In other words, the user of the present invention can obtain information from contexts other than the present active context.

Next the program compares the name of the active context to each pattern of a list of contexts supplied by the directory file during program initialization until a match is found. At step 32, the next context listed in the directory file is evaluated by the program. A feature of the present invention is that it evaluates all contexts listed in the directory file to determine whether help information is available. As will be fully described hereinafter, the present invention successively searches through each context file in determining whether help information exists for the user's selection.

At step 34, the program determines whether the context pattern retrieved from the directory matches the active context. Many techniques for comparing the retrieved context pattern with the active selection are well-known to the skilled in the art. The specific technique used for the comparison is not an essential feature of the present invention.

If the context pattern being evaluated matches the active context, as determined at step 34 and there has been no prior match as determined at step 36, an active context-specific help file is identified at step 38. From the context name, the name of the help file is constructed. This file maps selected strings to help menus (where a help menu consists of pairs of help items to be presented in the menu and associated strings or actions to be performed if the item is selected). Since the program of the present invention has the ability to relate the identity of the selected context to the associated help file, the name of the particular help file does not have to be related to the associated context name. However, the skilled in the field will appreciate giving the help file a name that is easily associated with the name of the corresponding context. As previously noted, help files are desirably given the same name as the associated context, but the help file is given a unique file extension.

At step 40, the active selection is compared to the tag entries in the help file to determine whether a match exists between the active selection and the topics that have help information available. If a match is found, execution proceeds to step 42 where a help menu for the active selection is graphically constructed. Any technique for graphically representing the help menu to the user may be employed because neither the construction of the help menu nor its physical appearance are essential features of the present invention.

In the event that no match is found between the active selection and the list of available topics in the help file, or if the active context was previously matched with a context pattern at step 36, the program moves from step 36 or 40 to step 44. At step 44, the program determines whether the entire list of contexts stored in the directory file has been searched. If all contexts have been searched, execution of the program stops at step 46 until the next invocation by the user and the constructed help menu is provided to the user, refer to FIG. 4. If all contexts listed in the directory file have not been searched, program control passes to step 32 where the next context listed in the directory file is searched. In this manner, the program evaluates all contexts listed in the directory file to determine if any context defines information requested by the user of the program.

If no match exists after evaluating whether the active selection matches the context presently being searched (step 34), program execution passes to step 48. If execution passes to step 48, then the user's help selection corresponds to a non-active context. In other words, the user can employ the other contexts browsing 10 feature of the present invention. At step 48, the specific non-active context help file associated with the request is determined.

At step 50, the active selection is compared to the available help selections in the help file of the context being evaluated. If the active selection corresponds to an available help entry in the help context file being evaluated, a help menu is constructed for the non-active context at step 52. Like the construction of an active context help menu (step 42), the details of graphically constructing the non-active context help menu are not an essential feature of the present invention. In the event that the active selection does not correspond to an entry in the help file of the context being evaluated, execution of the program passes to step 44 and continues as previously described. In this manner, all context help files are searched and the help topic requested by the user is found and the appropriate help menu is displayed.

Figure 4:
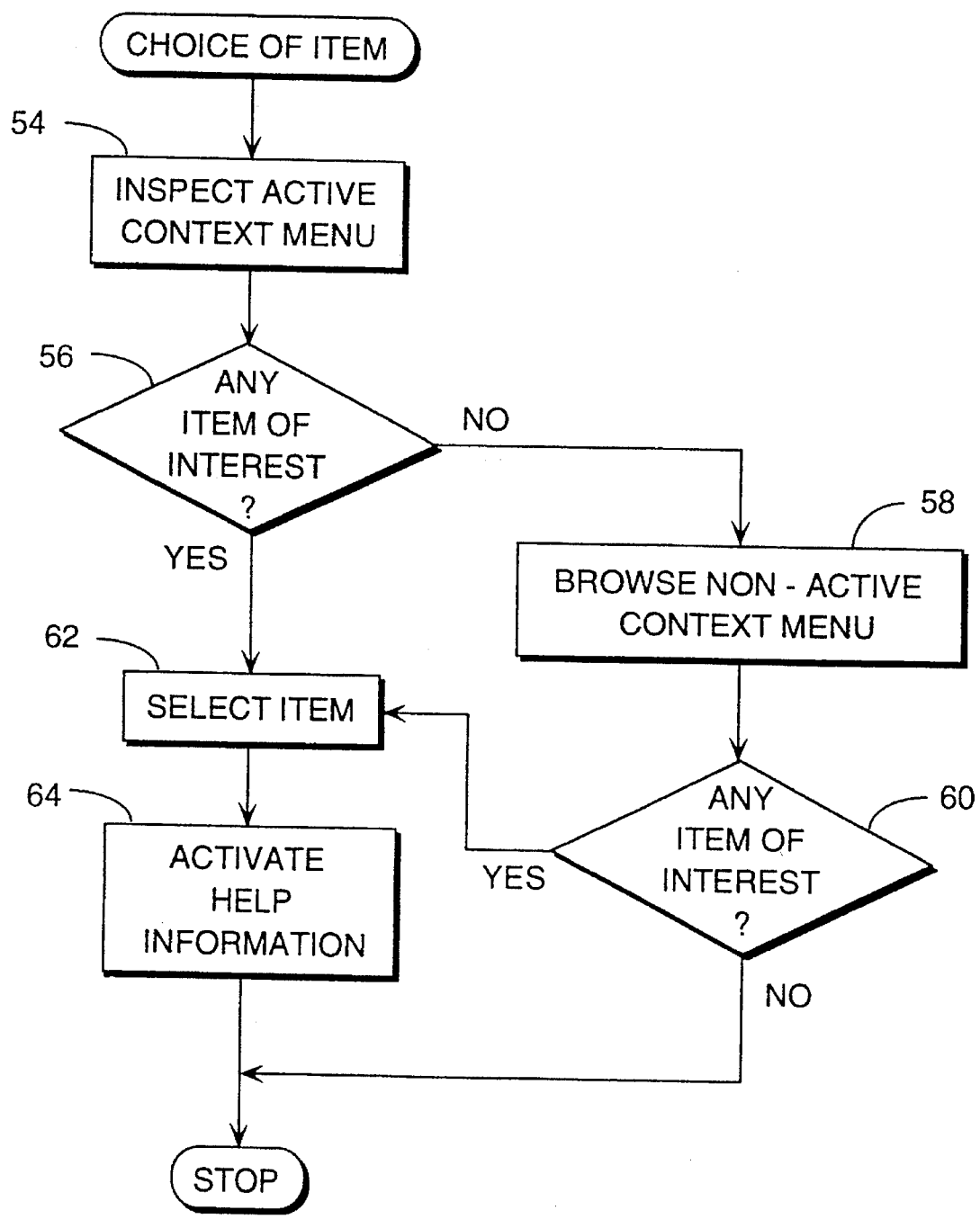
FIG. 4 is a flow chart showing the operation of a preferred software embodiment of the method of the present invention relative to the choice of a help menu item by a user.

FIG. 4 is a flow chart showing the steps taken for responding to a user choice in a preferred software embodiment of the method of the present invention. After the appropriate help menu is identified and constructed, the user of the program inspects it at step 54 and determines if he wishes to view information about any item displayed thereon, step 56. Alternatively, if the user chooses, the non-active context help menu may be browsed, as shown at step 58. When the user identifies an item of interest on the non-active context help menu (step 60) or the active context help menu (step 56), an item selection is made at step 62. When a specific item is selected, the associated help text is displayed, as shown at step 64.

Figure 5:
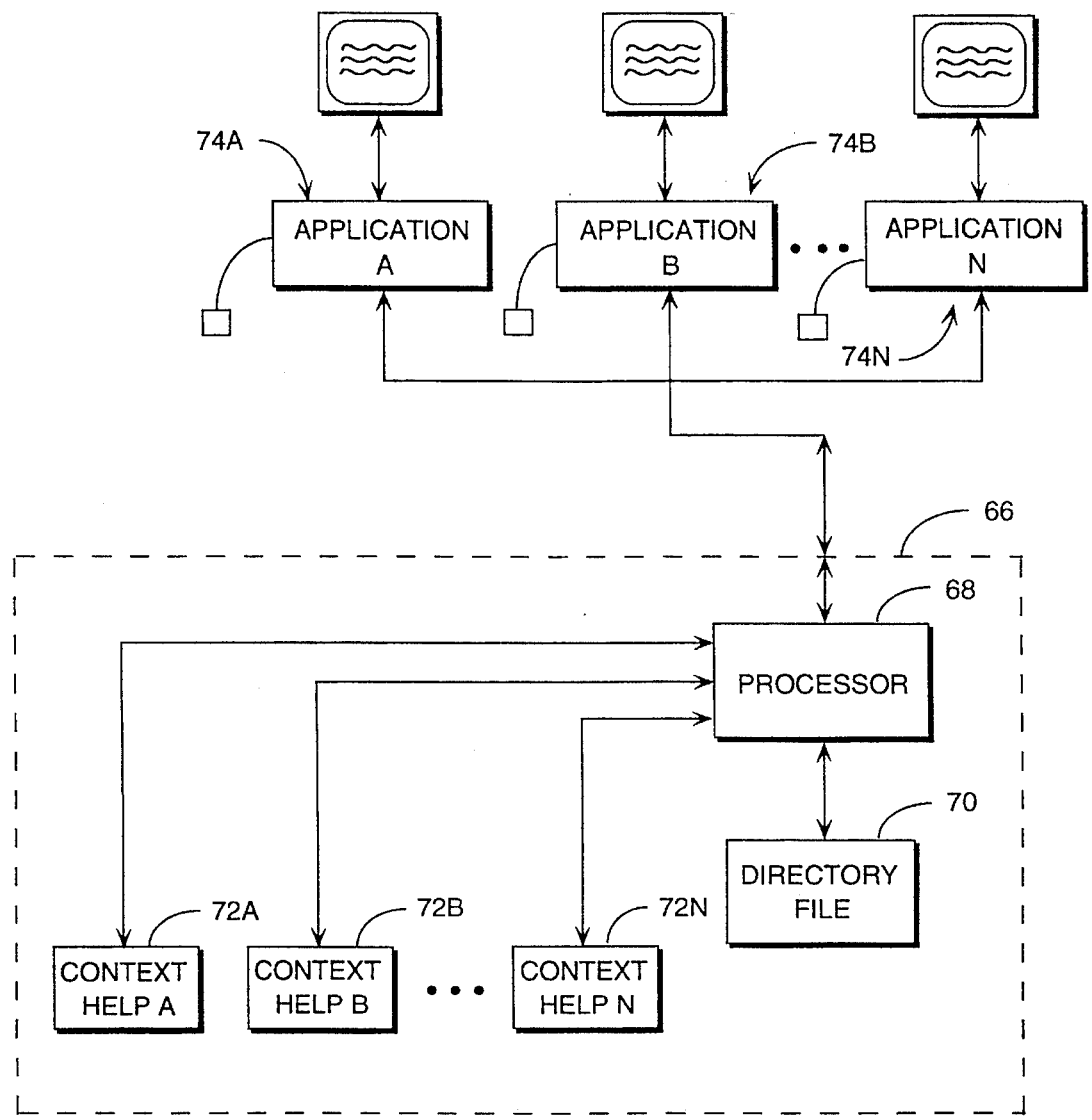
FIG. 5 is a simplified block diagram of a computer system suitable for executing a software program embodying the method of the present invention.

FIG. 5 is a simplified block diagram of a computer system suitable for executing a software program embodying the method of the present invention. System components associated with the host computer are enclosed in a dashed box 66. The components include a microprocessor 68 for executing a software program embodying the method of the present invention. The microprocessor 68 has access to a directory file 70, which is constructed as previously described and a plurality of individual context help files 72a through 72n.

The user at unit 74a invokes the program of the present invention (step 14, FIG. 1) by any appropriate keystroke and mouse click combination. In the preferred embodiment, the program uses the name of the windowing application as the trigger to identify the active context and the user makes a selection of the subject matter about which help is needed, the active selection. The active context is compared to each context pattern in the directory file 70. If the context pattern retrieved from the directory 70 matches the active context, an active context specific help file, for example, 72a is identified (step 38, FIG. 3). If there is a match between the active selection and the topics that have help available, a help menu for the active selection is constructed (steps 40, 42, FIG. 3). Of course, if there is no match with the active selection no help file is constructed. For each context pattern from the directory file 70 that does not match the active context, a non-active context specific help file, for example 72b is identified (step 48, FIG. 3). If there is a match between the active selection and the topics that have help available, a non-active context help file is constructed (steps 50, 52, FIG. 3). Thus the program searches all context patterns listed in the directory file 70 to construct an active context help file and a non-active context help file without having the user invoke any separate applications or even knowing what other applications exist. The active context help file is displayed to the user at terminal 74a for the selection of any item of interest. The user may also decide to browse the non-active context help file on the screen at terminal 74a without interrupting the current application being run by the user.

Accordingly, a user-definable help system for computers has been disclosed. It will be understood that various changes in the details and arrangements of the implementation described herein will occur to those skilled in the art without departing from the principal and scope of the present invention. Thus, while the invention has been described with reference to the presently contemplated best mode for practicing the invention, it is intended that this invention only be limited by the scope of the appended claims.

The following program listing is a present preferred listing for the method of providing application independent, context sensitive information assistance with other context browsing to computer program users:

```
/******************************************************************
**                                                                *
**              COPYRIGHT (c) 1990, 1991, 1992 BY                 *
**         DIGITAL EQUIPMENT CORPORATION, MAYNARD, MASS.          *
**                    ALL RIGHTS RESERVED                         *
**                                                                *
*******************************************************************
*/
include <stdio.h>
include <taglibrary.h>
#include <ofsenv.h>
#ifdef VMS
#include <types.h>
#include <stat.h>
#endif
#ifdef ULTRIX
#include <sys/types.h>
#include <sys/stat.h>
#endif
static char directory [] = "directory.contexts";
static char* f_dir = (char*) NULL;
extern char* curr_path;
static int mode;
static int startup = 0;
int recently_read = 0;
```

```
        statis int ontxtdir_lmt = 0;
        extern int path_changed;
        OFTLTagLibraryPtr cntxts_list = (OFTLTagLibraryPtr) NULL;

long int OFXGetContextName(context,name)
 5              OFTLTagLibraryPtr context;
                char** name;
        {
          if (context = (OFTLTagLibraryPtr) NULL) return (1);
          if (*name != (char*) NULL) return (1);
10        if (context -> name = (char*) NULL) return (0);

*name = (char*) calloc(strlen(context -> name) + 1,sizeof(char));
          if (*name = (char*) NULL)
             {
               fprintf(stderr,
15                       "OFXGetContextName: unable to allocate memory.\n");
               return (1);
             )
         strcpy(*name,context -> name);

return (0);
20       } long int OFXSetContextName(context,name)
                 OFTLTagLibraryPtr context;
                 char* name;
         [
25         if (context = (OFTLTagLibraryPtr) NULL) return (1);
           if (name = (char*) NULL) return (1);

if (context -> name != (char*) NULL)
              (
                cfree(context -> name); context -> name = (char*) NULL;)

30         context -> name = (char*) calloc(strlen(name) + 1,sizeof(char));
           if (context -> name = (char*) NULL)
              (
                fprintf(stderr,
                         "OFXSetContextName: unable to allocate memory.\n");
35              return (1);
              }
           strcpy(context -> name, name);

return (0);
         }

40       long int OFXGetContextPattern(context,pattern)
                 OFTLTagLibraryPtr context;
                 char** pattern;
         {
           if (context = (OFTLTagLibraryPtr) NULL) return (1);
45         if (*pattern != (char*) NULL) return (1);
           if (context -> pattern = (char*) NULL) return (0);

*pattern = (char*) calloc(strlen(context -> pattern) + 1,sizeof(char));
```

```
      if (*pattern = (char*) NULL)
         {
            fprintf(stderr,
                    "OFXGetContextPattern: unable to allocate memory.\n");
            return (1);
         }
      strcpy(*pattern,context -> pattern);

return (0);
   }
   long int OFXSetContextPattern(context,pattern)
         OFTLTagLibraryPtr context;
         char* pattern;
   {
      if (context = (OFTLTagLibraryPtr) NULL) return (1);
      if (pattern = (char*) NULL) return (1);

if (context -> pattern != (char*) NULL)
         {
            cfree(context -> pattern); context -> pattern = (char*) NULL;)

context -> pattern = (char*) calloc(strlen(pattern) + 1,sizeof(char));
      if (context -> pattern = (char*) NULL)
         {
            fprintf(stderr,
                    "OFXSetContextPattern: unable to allocate memory.\n");
            return (1);
         }
      strcpy(context -> pattern,pattern);

return (0);
   } long int OFXFetchContextByName(name,tlptr)
            char* name;
            OFTLTagLibraryPtr *tlptr;
   {
     long int i,n_tags;

*tlptr = cntxts list;
     while (*tlptr != (OFTLTagLibraryPtr) NULL)
        {
           if (strcmp((*tlptr)->name,name) = 0)
              return (0);
           else
              (*tlptr) = (*tlptr) -> next;
        }
     return (1);
   } long int OFXFetchContextByPattern(pattern,tlptr)
            char* pattern;
            OFTLTagLibraryPtr *tlptr;
   {
     long int i,n_tags;
```

```
          *tlptr = cntxts_list;
          while (*tlptr != (OFTLTagLibraryPtr) NULL)
             {
                if (strcmp((*tlptr)->pattern,pattern) = 0)
  5                return (0);
                else
                   (*tlptr) = (*tlptr) -> next;
             }
          return (1);
 10    } long int OFXBuildCntxtsList (dir_file,place)
                  FILE* dir_file;
                  long int place; /* mode that indicates where to get tl files from */
       {
 15       OFTLTagLibraryPtr ourr_cntxt = (OFTLTagLibraryPtr)NULL;
          OFTLTagLibraryPtr temp_cntxt = (OFTLTagLibraryPtr)NULL;
          char cntxt_path_name[1024],*cntxt_name,cntxt_pat[1024],*cntxt_fn = (char*) NULL;
          char c,default_path[1024], *path = (char*) NULL;

/* read in the default path */
 20       strcpy(default_path,"");
          if ((c = getc (dir_file)) = ';')
             {
                fscanf(dir_file,"%s\n",default_path);
             }
 25       else
             ungetc(c,dir_file);

while (fscanf(dir_file, "%s%*[ \t\n]%[^\n]\n",cntxt_path_name,cntxt_pat) = 2)
             {
#ifdef VMS
 30          if (!(cntxt_name = (char*) strchr(cntxt_path_name,']')))
                cntxt_name = cntxt_path_name;
             else
                cntxt_name++;

#endif
 35 #ifdef ULTRIX
             if (cntxt_path_name[0] = '/')
                {
                   cntxt_name = (char*) strrchr (cntxt_path_name, '/');
                   cntxt_name++;
 40             }
             else
                cntxt_name = cntxt_path_name;
endif if (cntxt_fn) (cfree(cntxt_fn); cntxt_fn = (char*) NULL;)
 45          cntxt_fn = (char*) calloc(strlen(cntxt_path_name) + 3 + 1,sizeof(char));
             sprintf(cntxt_fn,"%s.tl",cntxt_path_name);
#ifdef  VMS
                if (cntxt_fn[0] ='[')
#endif
 50 #ifdef  ULTRIX
```

```
            if (cntxt_fn[0] = '/' | ‖ cntxt_fn{0} ='.')
#endif
              path = cntxt_fn;
            else
              if (strcmp(default_path,"") != 0)
                {
                   path = (char*) calloc(strlen(cntxt_fn) + strlen(default_path) + 1,
                                         sizeof(char));
                   sprintf(path,"%s%s",default_path,cntxt_fn);
                }
              else
                switch (place)
                  {
                  case 1: path = (char*) OFSEnvGetPersonalResourseFile(cntxt_fn);
                    break;
                  case 2: path = cntxt_fn; break;
                  case 3: path = (char*) OFSEnvGetHomeResourceFile(cntxt_fn); break;
                  case 4: path = (char*) OFSEnvGetSystemResourceFile(cntxt_fn); break;
                  default: break;
                  } if (OFTLTCreateLibrary(cntxt_name,path,cntxt_pat,&curr_cntxt)  != 0)
              {
                 curr_cntxt = (OFTTagLibraryPtr) NULL;
                 /* free any allocated memory */
                 if (cntxt_fn) (cfree(cntxt_fn); cntxt_fn = (char*) NULL;)
                 if (path) (cfree(path); path = (char*) NULL;)
                 continue;
              } if (OFTLReadLibrary(curr_cntxt)  != 0)
              {
                 if (curr_cntxt)
                   {
                      OFTLFreeLibrary(curr_cntxt);
                      curr_cntxt = (OFTLTagLibraryPtr) NULL;
                   }
                 /* free any allocated memory */
                 if (cntxt_fn) (cfree(cntxt_fn); cntxt_fn = (char*) NULL;)
                 if (path) (cfree(path); path = (char*) NULL;)
                 continue;
              }

/* insert current context at the end of the contexts list*/
            if (cntxts_list = (OFTLTagLibraryPtr) NULL)
              cntxts_list = curr_cntxt;
            else
              {
                 temp_cntxt = cntxts_list;
                 while (temp_cntxt -> next != (OFTLTagLibraryPtr) NULL)
                   temp_cntxt = temp_cntxt -> next;
                 temp_cntxt -> next = curr_cntxt;
              }
            curr_cntxt = (OFTLTagLibraryPtr) NULL;
          }
         if (cntxt_fn) (cfree)cntxt_fn); cntxt_fn = (char*) NULL;)
```

```
              if (path) (cfree)(path); path = (char*) NULL;)
              return (0);
        } long int OFXReadCntxtLibraries()
  5     {
          FILE* fp;
          struct stat stat_f ;
          OFTLTagLibraryPtr temp_cntxt = (OFTLTagLibraryPtr)NULL;
          char* t_path = (char*) NULL;

10       recently_read = 0;
          /* open the directory file from path set in env */
          if ((f_dir = (char*)OFSEnvGetPersonalResourceFile(directory))!=(char*) NULL)
            {
              if (stat(f_dir,&stat_f) = 0)
 15             {
                  if ((!startup) || path changed ||
                      (stat_f.st_mtime > cntxtdir_lmt)}
                    {
                      cntxtdir_lmt = stat_f.st_mtime;
 20                   if ((fp = fopen(f_dir,"r")) != (FILE*) NULL)
                        {
                          mode = 1;
                          t_path = (char*) OFSEnvGetPersonalTagLibraryDir();
                          if (!startup)
 25                         {
                              curr_path =
                                  (char*) calloc(strlen(t_path) + 1,sizeof(char));
                              sprintf(curr_path,"%s",t_path);
                            }
 30                       startup = 1;
                          path_changed = 0;
                          temp_cntxt = cntxts_list;
                          while (temp_cntxt != (OFTLTagLibraryPtr) NULL)
 35                         {
                              cntxts_list = cntxts_list -> next;
                              OFTLFreeLibrary(temp_cntxt):
                              temp_cntxt = cntxts_list;
                            }
                          if (OFXbuildCntxtsList(fp,mode) = 0)
 40                         {
                              recently_read = 1;
                              /* free f_dir and then return */
                              if (f_dir) ( cfree(f_dir); f_dir = (char*) NULL;)
                              return (0);
 45                         }
                        }
                      /* unable to open the contexts directory in the current path*/
                      else
                        {
 50                       fprintf(stderr,
                    "Accelerator: cannot open contexts directory file:%s\n",f_dir );
                          /* free f_dir and then return */
                          if (f_dir) ( cfree(f_dir); f_dir = (char*) NULL;)
                          return (1);
```

```
              }
           }
           /* the contexts directory was not updated since last read */
           else
           {
              /* free f_dir and then return */
              if (f_dir) { cfree(f_dir); f_dir = (char*) NULL;}
              return (0);
           }
        }
        /* unable to perform stat on the context directory */
        else
        {
           fprintf(stderr,
              "Accelerator: failed to get stat on directory file: %s\n",f_dir);
           /* free f_dir and then return */
           if (f_dir) ( cfree(f_dir); f_dir = (char*) NULL;)
           return (1);
        }
     }
/* else
     fprintf(stderr,"Accelerator: defaulting environment to current directory\n"); */

/*else look in current directory */
/* free f_dir */
if (f_dir) ( cfree(f_dir); f_dir = (char*) NULL;)
f_dir = directory;
if (stat(f_dir,&stat_f) = 0)
     {
        if ((!startup) || path_changed || (stat_f.st_mtime > cntxtdir_lmt))
        {
           if ((fp = fopen(f_dir,"r")) != (FILE*) NULL)
           {
              mode = 2;
              if (!startup)
                 {
                    curr_path =
                       (char*) calloc(strlen("./") + 1,sizeof(char));
                    sprintf(curr_path,"%s","./");
                 )
              startup = 1;
              path_changed = 0;
              temp_cntxt = cntxts_list;
              while (temp_cntxt != (OFTLTagLibraryPtr) NULL)
                 {
                    cntxts_list = cntxts_list -> next;
                    OFTLFreeLibrary(temp_cntxt);
                    temp_cntxt = cntxts_list;
                 }
              if (OFXBuildCntxtsList(fp,mode) = 0)
                 {
                    recently_read = 1;
                    return (0);
                 }
           }
           /* unable to open the contexts directory in the current path */
```

```
                                else
                                    fprintf(stderr,
                    "Accelerator: cannot open directory file. defaulting to home directory\n");
                            }
                        /* the contexts directory was not updated since last read */
                        else
                            return (0);
                    }
            /* unable to perform stat on the context directory */
            /*else
                fprintf(stderr, "Accelerator: defaulting to home directory\n");*/

/* otherwise, look in home directory first, */
            f_dir = (char*) NULL;
            if ((f_dir = (char*)OFSEnvGetHomeResourceFile(directory)) != (char*) NULL)
                {
                    if (stat(f_dir,&stat_f) == 0)
                    {
                        if ((!startup) || path_changed ||
                                (stat_f.st_mtime > stat_f.st_atime))
                        {
                            if ((fp = fopen(f_dir,"r")) != (FILE*) NULL)
                            {
                                mode = 3;
                                t_path = (char*) OFSEnvGetHomeTagLibraryDir();
                                if (!startup)
                                    {
                                        curr_path =
                                            (char*) calloc(strlen(t_path) + 1,sizeof(char));
                                        sprintf(curr_path,"%s",t_path);
                                    }
                                startup = 1;
                                path_changed = 0;
                                temp_cntxt - cntxts_list;
                                while (temp_cntxt != (OFTLTagLibraryPtr) NULL)
                                {
                                    cntxts_list = cntxts_list -> next;
                                    OFTLFreeLibrary(temp_cntxt);
                                    temp_cntxt - cntxts_list;
                                }
                                if (OFXBuildCntxtsList(fp,mode) == 0)
                                {
                                    recently_read = 1;
                                    /* free f_dir and then return */
                                    if (f_dir) ( cfree(f_dir); f_dir = (char*) NULL;)
                                    return (0);
                                }
                            }
                            /* unable to open the contexts directory in the current path */
                            else
                                fprintf(stderr,
                    "Accelerator: cannot open directory file. defaulting to system directory\n");
                        }
                        /* the contexts directory was not updated since last read */
                        else
                            {
```

```
                    /* free f_dir and then return */
                    if (f_dir) ( cfree(f_dir); f_dir = (char*) NULL;)
                    return (0);

)
5           )
        /* unable to perform stat on the context directory */
        /*else
            fprintf(stderr, "Accelerator: defaulting to system directory\n");*/
    )
10  /* free f_dir */
    if (f_dir) ( cfree(f_dir); f_dir = (char*) NULL;)
    /* followed by the system default */
    f_dir = (char*) NULL;
    if ((f_dir = (char*) OFSEnvGetSystemResourceFile(directory))   != (char*) NULL)
15      (
        if (stat(f_dir,&stat_f) = 0)
            (
            if ((!startup) || path_chaged ||
20              (stat_f.st_mtime > stat_f.st_atime))
                (
                if ((fp = fopen(f_dir,"r")) != (FILE*) NULL)
                    (
                    mode = 4;
                    tpath = (char*) OFSEnvGetSystemTagLibraryDir();
25                  if (!startup)
                    (
```

```
                                curr_path =
                                    (char*) calloc(strlen(t_path) + 1,sizeof(char));
                                sprintf(curr_path,"%s",t_path);
                            }
    5                       startup = 1;
                            path_changed = 0;
                            temp_cntxt = cntxts_list;
                            while (temp_cntxt != (OFTLTagLibraryPtr) NULL)
                            {
   10                           cntxts_list = cntxts_list -> next;
                                OFTLFreeLibrary(temp_cntxt);
                                temp_cntxt = cntxts_list;
                            }
                            if (OFXBuildCntxtsList (fp,mode) = 0)
   15                       {
                                recently_read = 1;
                                /* free f_dir and then return */
                                if (f_dir) { cfree(f_dir); f_dir = (char*) NULL;)
                                return (0);
   20                       )
                        }
                    /* unable to open the contexts directory in the current path */
                    else
                        {
   25                       fprintf(stderr,
                "Accelerator: cannot open system context directory file\n");
                            /* free f_dir and then return */
                            if (f_dir) { cfree(f_dir; f_dir = (char*) NULL;)
                            return (1);
   30                   )
                }
                /* the contexts directory was not updated since last read */
                else
                    (
   35                   /* free f_dir and then return */
                        if (f_dir) ( cfree(f_dir); f_dir = (char*) NULL;)
                        return (0);
                    )
            )
   40       /* unable to perform stat on the context directory */
            else
            (
                fprintf(stderr)
            "Accelerator: cannot verify updates to system context directory file\n");
   45           /* free f_dir and then return */
                if (f_dir) ( cfree(f_dir); f_dir = (char*) NULL;)
                return (1);
            }
        }
   50   /* unable to get the context directory from any location */
        return (1);
    }
    /*
```

```
/************************************************************************
 **                                                                    *
 **              COPYRIGHT (c) 1990, 1991, 1992 BY                     *
 **          DIGITAL EQUIPMENT CORPORATION, MAYNARD, MASS.             *
 **                    ALL RIGHTS RESERVED                             *
 **                                                                    *
 ************************************************************************
 */

/* Accelerator: program function description */

/* Method:
        The accelerator sets up a "grab" on a certain button event
        of interest (default is Ctrl-Shift-MB1) on the root window.  This means that
        whenever a Ctrl-Shift-MB1 is received by the server, it is directed to the
        accelerator and all other clients are prevented from seeing this event.

The accelerator's event handler handles this button event through
        the ButtonPress case in the OFXHandleEvents routine.  After determining
        the  window  title  of  the  active  context  window,  the  program  invokes
        XConvertSelection which makes a selection request (for the PRIMARY SELECTION)
        to the windowing system.  After the transfer of the selection, the windowing
        system application generates a SelectionNotify event to the requestor (which
        is the accelerator).  This signals the accelerator to access the
        transferred selection.

The selection provides the context in which a client application's users
        will be provided help in the pursuit of their task.

Once the accelerator (this program) acquires the selection (coded in the
        SelectionNotify case of the event handler), the routine OFXHandleSelection
        is invoked, to identify the help file corresponding to the active context,
        and to construct the active context and non active context help menus.

*/ include <stdio.h>
include <taglibrary.h>
#include <x-include.h>
#include <accl.h>
#include <acclwindow.h>
#include <callbacks.h>
#ifdef VMS
#include <stddef.h>
#include <ssdef.h>
#endif
#ifdef MOTIF
static XmStringCharSet charset = (XmStringCharSet) XmSTRING_DEFAULT_CHARSET;
endif typedef struct {
```

```
          int bell_volume;
      } OptionsRec ;

OptionsRec options;
      XtResource resources{1};
 5    extern void AskNoCB();
      Display *display;
      Window window;
      Window client_source_w;
      static char* buffer[10];
10    static char* cc_file; /* ptr to current context tag library file name */
      statio Boolean oc_present = FALSE; /* whether there are other contexts */
      Boolean ccm_present; /* whetehr there is a current context menu */
      Widget toplevel;
      XtAppContext app_context; /* application context */
15    char* curr_path = (char*) NULL; /* contains the new value of the environment */
      int path_changed = 0;
      Atom__ACCLENVDIR; /* private selection for users to modify their environment */
      Atom__ACCLENVRECEIVE; /* target selection to receive the modified value of environment
      */
20    Atom__OFXACCL_PRIV_ZERO;
      Atom__OFXACCL_PRIV_ONE;
      Atom__OFXACCL_PRIV_TWO;
      Boolean status;
      long int paste_ret;
25    char** cmd_string_ret = (char**) NULL;
      char *title = (char*) NULL;
      extern OFTLTagLibraryPtr cntxts_list;
      long int n_cmd_args = 0;

long int OFXMatchRE(re,str)
30        char* re,*str;
      {
        long int match;

if {re_comp(re)}
          {
35          fprintf(stderr,"Error compiling RE string.\n"};
            return (1);
          }
        match = re_exec(str);

if (match)
40        return (0);
        else
          return (1);

}
        long int OFXGetCutBuffers(buffer)
45        char* buffer[];
      {
        long int i,n_bytes_ret;
        for (i = 0 ; i < 8; i++)
          {
50          buffer[1+2] = XFetchBuffer (display, +n_bytes_ret,i);
```

```
        }
     return (0);
}
void OFXHandleEvents(argc,argv)
     long int argc;
     char** argv;
{ XEvent event;
Window w;
Time timestamp,xsel_timestamp;
Atom type_returned = None;
long offset = 0;
long length = 1000;
long int i;
int format_returned;
Boolean dispatched,primary,secondary,primary_sn = 0;
Boolean secondary_sn = 0;
unsigned long num_items_returned;
unsigned long bytes_remaining;
char *byte_ret, *wm_name_str = (char*) NULL;
char* wm_class_str = (char*) NULL;
long int nbytes_ret;

primary = secondary = 0;
for (; ;)
   {
     XtAppNextEvent(app_context,&event);
     switch (event.type)
        {
        case ButtonPress:
          { if (event.xbutton.window = DefaultRootWindow(display))
             {
               timestamp = event.xbutton.time;
               if (event.xbutton.subwindow !=None)
                 client_source_w = XmuClientWindow
                    (display, event.xbutton.subwindow);
               else
                 client_source_w = event.xbutton.window;
               if   (cmd_string_ret)   {XtFree(cmd_string_ret);    cmd_string_ret    =
(char**)NULL;}
               if (title) {XtFree(title); title = (char*)NULL;}
                  {
                    if (XFetchName(display,client_source_w,&title) = 0)
                      {title = (char*) calloc(strlen("Unknown") + 1, sizeof(char));
                       strcpy(title,"Unknown");}
                  }
               if (OFXGetCutBuffers(buffer) != 0)
                  fprintf(stderr,"Error getting cut buffers.\n"};
               XConvertSelection(display,XA_PRIMARY,XA_STRING,
                              __OFXACCL_PRIV_ONE ,window,
                                   timestamp);
               XConvertSelection(display,XA_SECONDARY,XA_STRING,
                              __OFXACCL_PRIV_TWO, window,
                                   timestamp);
             }
          XtDispatchEvent(&event);
          break;
```

```
        }
case ButtonRelease:
   {
      if (event.xbutton.window = DefaultRootWindow(display))
         {
            /* reset the timestamp to 0 */
            timestamp = 0;
            if (!primary_an || [secondary_an) XBell(display,options.bell_volume);
            primary_sn = secondary_sn =0;}
      XtDispatchEvent(&event);
      break;
   }
case PropertyNotify:
   {
      XtDispatchEvent(&event);
   }
case SelectionClear:
```

```
/****************************************************************************
**                                                                          *
**                  COPYRIGHT (c) 1990, 1991, 1992 BY                       *
**             DIGITAL EQUIPMENT CORPORATION, MAYNARD, MASS.                *
**                          ALL RIGHTS RESERVED                             *
**                                                                          *
*****************************************************************************
*/

/*   Accelerator:  program function description */
/*   Method:
     The accelerator sets up a "grab" on a certain button event of interest (default
     is Ctrl-Shift-MB1) on the root window. This means that whenever a Ctrl-Shift-MB1
     is received by the server, it is directed to the accelerator and all other
     clients are prevented from seeing this event.

The accelerator's event handler handles this button event through the Button-
     Press case in the OFXHandleEvents routine. After determining the window title
     of the active context window, the program invokes XConvertSelection which makes
     a selection request (for the PRIMARY SELECTION) to the windowing system. After
     the transfer of the selection, the windowing system application generates a
     SelectionNotify event to the requestor (which is the accelerator). This signals
     the accelerator to access the transferred selection.

The selection provides the context in which a client application's users will be
     provided help in the pursuit of their task.

Once the accelerator (this program) acquires the selection (coded in the
     SelectionNotify case of the event handler), the routine OFXHandleSelection is
     invoked, to identify the help file corresponding to the active context, and to
     construct the active context and non active context help menus.
*/ include <stdio.h>
include <taglibrary.h>
#include <x-include.h>
#include <accl.h>
#include <acclwindow.h>
#include <callbacks.h>
#ifdef VMS
#include <stddef.h>
#include <ssdef.h>
#endif
#ifdef MOTIF
static XmStringCharSet charset = {XmStringCharSet} XmSTRING_DEFAULT_CHARSET;
endif Typedef struct {
        {
           if ((event.xselectionclear.window = window) &&
               (event.xselectionclear.selection = __ACCLENVDIR)}
            {xsel_timestamp = event.xselectionclear.time;
              XConvertSelection(display,__ACCLENVDIR, XA_STRING,
```

```
                                        __ACCLENVRECEIVE,window,xsel_timestamp):}
                  XtDispatchEvent(&event); break;
              }
              case SelectionRequest:
              {
                  /* create a selection notify event structure */
                  XEvent notify;
                  notify.type = SelectionNotify;
                  notify-xselection.requestor = event.xselectionrequest.requestor;
                  notify-xselection.selection = event.xselectionrequest.selection;
                  notify.xselectio.target =event.xselectionrequest.target;
                  notify.xselection.property =event.xselectionrequest.property;
                  notify.xselection.time = event.xselectionrequest.time;
                  if ((event.xselectionrequest.selection = XA_PRIMARY) &&
                      (event.xselectionrequest.target = XA_STRING))
                      XChangeProperty(display,event.xselectionrequest.requestor,
                                  event.xselectionrequest.property,
                                  event.xselectionrequest.target, 8,
                                  PropModelReplace, (char*)p_buffer,
                                  strlen (p_buffer));
                  else
                      if ((event.xselectionrequest.selection = XA_SECONDARY) &&
                          (event.xselectionrequest.target = XA _STRING))
                          XChangeProperty(display,event.xselectionrequest.requestor,
                                      event.xselectionrequest.property,
                                      event.xselectionrequest.target,8,
                                      PropModeReplace,(char*)p_buffer,
                                      strlen(p_buffer));
                  else
                      if ((event.xselectionrequest.selection = ACCLENVDIR) &&
                          (event.xselectionrequest.target = XA_STRING))
                          XChangeProperty(display,event.xselectionrequest.requestor,
                                      event.xselectionrequest.property,
                                      event.xselectionrequest.target, 8,
                                      PropModeReplace, (char*)curr_path,
                                      strlen(curr_path));
                  else
                      notify.xselection.property = None;
                  XSendEvent (display,notify.xselection.requestor,
                              False,0,&notify);
                  XtDispatchEvent (&event);
                  break;
              )
              case SelectionNotify:
              {
                  if ((event.xselection.time = timestamp) &&
                      (event.xselection.requestor = window))
                  {
                      if (event.xselection.selection = XA_PRIMARY)
                      {
                          while ((status = XGetWindowProperty
                                  (display,window,__OFXACCL_PRIV_ONE,offset,length,
                                  FALSE,XA_STRING,&type_returned,&format_returned,
                                  &num_items_returned,&bytes_remaining,
                                  &buffer[0])) != Success)
                              ;
```

```
            XDeleteProperty(display,window,__OFXACCL_PRIV_ONE);
            primary = 1; primary_sn = 1;
          }
       if (event.xselection.selection = XA_SECONDARY)
          {
            while ((status = XGetWindowProperty
                    (display,window,__OFXACCL_PRIV_TWO,offset,length,
                    FALSE,XA_STRING,&type_returned,&format_returned,
                    &num_items returned,&bytes_remaining,
                    &buffer[1]))  != Success)
              ;
            XDeleteProperty(display,window,__OFXACCL_PRIV_TWO);
            secondary = 1; secondary_sn = 1;
          )
       if (primary && secondary)
          {
            primary = secondary = 0;
            if (OfXHandleSelection(buffer,argc,argv) != 0)
              fprintf(stderr,"Error handling selection.\n");

for (i = 0; i < 10; i++)
              {
                if (buffer[i] && (strcmp(buffer[1],"") ! + 0))
                  XFree(buffer[i]);
              }
            /* free title here jg 11/08/91 */
            if (title) {XFree(title); title = (char*) NULL;}
          }
       }
       if ((event.xselection.time = xsel_timestamp) &&
           (event.xselection.requestor = window) &&
           (event.xselection.selection =__ACCLENVDIR))
         {
           if (curr_path)
             (cfree(curr_path); curr_path = (char*) NULL;}
           while ((status = XGetWindowProperty
                   (display,window,__ACCLENVRECEIVE,offset,length,FALSE,
                   XA_STRING,&type_returned,&format_returned,
                   &num_items returned,&bytes_remaining,
                   &curr_path)) != Success)
             ;
           if (OFSEnvSetPersonalTagLibraryDir(curr_path) != 0) return;
           path changed = 1;
           XSetSelectionOwner(display,__ACCLENVDIR,window,
                              event.xselection.time);
           XDeleteProperty (display,window,__ACCLENVRECEIVE);
          )
        XtDispatchEvent(&event);
        break;
      }
    default:
      (
        XtDispatchEvent (&event);
      }
    }
  }
```

```
     }
     char* OFXGetNextApplication(app_str)
         char* app_str;
     {
 5     static char* mark_begin = (char*) NULL;
       static char* mark_end = (char*) NULL;

if (app_str)
         {
10         mark_begin = app_str;
           mark_end = (char*) strchr (app_str,',');
           if (mark_end)  *mark_end = '\0';
         }
       if (!app_atr)
         {
15         if (!mark_end) return (char*) mark_end;
           mark_begin = ++mark_End;
           mark_end = (char*) strchr (mark_begin,',');
           if (mark_end)  *mark_end = '\0';
         }
20     return (char*) mark_begin;
     }
     char* OFXGetNextPasteApplication(app_str)
         char* app_str;
     {
25     static char* mark_begin = (char*) NULL;
       static char* mark_end = (char*) NULL;

if (app_str)
         {
           mark_begin = app_str;
30         mark_end = (char*) strohr(app_str,',');
           if (mark_end)  *mark_end = '\0';
         }
       if (!app_str)
         {
35         if (!mark_end) return (char*) mark_end;
           mark_begin = ++mark_end;
           mark_end = (char*) strchr(mark_begin,',');
           if (mark_end)  *mark_end = '\0';
         }
40     return (char*) mark_begin;
     }
     char* OFXReturnSelectionChoice(buffer,choice)
         char* buffer[];
         long int choice;
45   {
       switch (choice)
         {
         case 0: {   return  (buffer [0]);   }
         case 1: {   return  (buffer [1]);   }
50       case 2: {   return  (buffer [2]);   }
         case 3: {   return  (buffer [3]);   }
         case 4: {   return  (buffer [4]);   }
         case 5: {   return  (buffer [5]);   }
         case 6: {   return  (buffer [6]);   }
```

```
      case 7: {  return   (buffer [7]);  }
      case 8: {  return   (buffer [8]);  }
      case 9: {  return   (buffer [9]);  }
      /* the default is to return primary contents */
      default: ( return (buffer[0]);      }
    }
  }
  long int OFXGetCmdStringContext (cmd_string,context)
      char* cmd_string;
      OFTLTagLibraryPtr *context;
  {
    char* pattern = (char*) NULL;

if (cmd_string = (char*) NULL) return(1);

*context = cntxte_list;
    while (*context != (OFTLTagLibraryPtr) NULL)
      {
        if (OFXGetContextPattern(*context,&pattern) != 0)
          return (1); /* failure message box needed */
        if (OFXMatchRE(pattern,cmd_string) = 0)
          return (0);
        else
          *context = (*context) -> next;
        if (pattern) (cfree(pattern); pattern = (char*) NULL;}
      }
    return (1);
  }
  long int OFXGetCmdStringSelectionValues(cmd_string,selection,tag,n_values)
      char* cmd_string,*selection;
      OFTLTagPtr *tag;
      long int *n_values;
  {
    OFTLTagLibraryPtr context = (OFTLTagLibraryPtr) NULL;
    long int num_values;
    /* get the appropriate context for this command string (or title) */
    if (OFXGetCmdStringContexts (cmd_string,&context) != 0) return (1);
    /* get the tag structure by name for the resource arg. selection */
    if (OFTLFetchTagByName(selection,context,tag) != 0) return (1);
    /* get the number of values for this tag */
    if (OFTLGetNumberOfValues(*tag,n_values) != 0) return (1);
    /* *n_values = num_values; */ return (0);

}
  #ifdef ULTRIX
  long int OFXCreateOtherContextsList();
  #endif ifdef VMS
  long int OFXCreateOtherContextsList (Widget parent, char* context,
                                        char* selection);
  #endif long int OFXCreateOtherSelectionMenu(parent,context,selection)
```

```
            Widget parent;
            char* context,*selection;
     (
    #ifdef DW
5      DwtCompString entry_label;
    #endif OFTLTagLibraryPtr cntxt_lib = (OFTLTagLibraryPtr) NULL;
        OFTLTagPtr tag = (OFTLTagPtr) Null;
        OFTLValuePtr value = (OFTLValuePtr) Null;
10      char* nickname = (char*) Null;
        long int n_values;
        Widget context_pulldown,context_entry,selection_b,sep1;
        char* entry_name = (char*) NULL;
        long int argcount = 0;
15      Arg arglist[5];

entry_name = (char*) calloc(strlen(context) + 9 + 1,sizeof(char));
        sprintf(entry_name, "Context: %s",context);
    #ifdef DW
        /* This is the pull down that will contain a submenu of other contexts*/
20      context_pulldown = DwtMenuPulldownCreate(parent,
                                                "context_pulldown",NULL,0);
        if (AddWidgetToStack(context_pulldown) != 0) return (1);
        if (OFXCreateOtherContextList(context_pulldown,context,selection) != 0)
            return (1);
25      /* Create a pulldown entry/cascade button for the context information */
        argcount = 0;

entry_label = DwtLatin1String(entry_name);
        SetArg(DwtNaubMenuId,context_pulldown);
        SetArg(DwtNlabel,entry_label):
30      /*SetArg(DwtNsensitive,FALSE};*/
        context_entry = DwtPullDownMenuEntryCreate(parent,context,arglist,argcount);
        if (AddWidgetToStack(context_entry) !=0} return (1);
        XtManageChild(contex_entry);
        sep1 = DwtSeparatorCreate(parent,"sep1",NULL,0);
35      if (AddWidgetToStack(sep1) !=0) return (1);
        XtManageChild(sep1);
    #endif
        if (entry_name) {cfree(entry_name); entry_name = (char*) NULL;}
    #ifdef DW
40      if (entry_label) {XtFree(entry_label); entry_label = (DwtCompString) NULL;}
    #Endif
        if (!selection || (selection && (strcmp(selection,"") = 0)))
           {
            entry_name = (char*) calloc(strlen("")+1 + 11,sizeof(char));
45          sprintf(entry_name,"Selection: %s","") ;
           }
        else
           {
            entry_name = (char*) calloc(strlen(selection} + 13 + 1,sizeof(char)};
50          sprintf(entry_name,"Selection: \"%s\"",selection);
           }
        /* create the "selection" button for the current menu */
    #ifdef DW
```

```
        /* Create a non selectable push button for the selection information */
        argcount = 0;
        entry_label = DwLatin1String(entry_name);
        SetArg(DwtNlabel, entry_label);
        SetArg(DwtNsensitive,FALSE);
        selection_b = DwtPushButtonCreate(parent,selection,arglist,argcount);
        if (AddWidgetToStack(selection_b) ! = 0) return (1);
        XtManageChild(selection_b);
#endif
        /* create the choices menu for this selection and context */
        if ((OFXFetchContextByName(context,&context_lib) = 0) &&
            (OFXRefreshContext (&cntxt_lib) = 0))
        {
#ifdef DW
            sep1 = DwtSeparatorCreate(parent,"sep1",NULL,0);
            if (AddWidgetToStack(sep1) !=0) return (1);
            XTManageChild(sep1);
#endif
            /* get the appropriate pastebuffer for this context */
            /* this is a hack. redo later */
            cntxt_lib -> ud_ptr = 11; /* default */
            if (OFTLFetchTagByName ("pasteto",cntxt_lib,&tag) = 0)
                if (OFTLGetNumberOfValues(tag,&n_values) = 0)
                    if (n_values > 0)
                    {
                        if (OFTLGetNthValue(tag,1,&value) = 0)
                        {
                            if (OFTLGetValueNickName(value,&nickname} = 0)
                                contxt_lib -> ud_ptr = atol(nickname);
                        }
                    }
            if {nickname} (cfree(nickname); nickname = {char*} NULL;}
            if (OFXMakeSelectionChoices(parent,cntxt_lib,selection) ! = 0)
                return (1);
        }
#ifdef DW
        if (entry_label) {XtFree(entry_label); entry_label = (DwtCompString) NULL;)
endif if (entry_name) {cfree(entry_name); entry_name = (char*) NULL;}
        return (0);
}
long int OFXCreateOtherSelectionsList(parent,context,selection)
        Widget parent;
        char* context,*selection;
{
#ifdef DW
    DwtCompString entry_label;
    DwtCallback Askiie[2];
#endif
    Widget other_so_entry,other_sc_pulldown,askme,sep1;
    Arg arglist[3];
    long int i,paste_into,argcount = 0;
    long int osm_present = 0;
    char* formatted_str = (char*) NULL;
    long int buffer_status = 0;
```

```
        for (i = 0; i < 10; i++)
        {
            if (buffer[i] && (strcmp(buffer[i],"") != 0})
                buffer_status = 1;
            else buffer_status = 0;
            if (formatted_str) (cfree(formatted_str); formatted_str = (char*) NULL;)
            switch (buffer_status)
            {
              case 0: continue;
              case 1:
                {
                    if (format_string(buffer[i],&formatted_str) != 0)
                        continue;
                    if (formatted_str)
                    {
                        if (selection)
                            if (strcmp(formatted_str,selection) = 0)
                                continue;
                        if (1 selection)
                            if (strcmp(formatted_str,"") = 0)
                                continue;
#ifdef DW
                        /* This pulldown will contain the choices submenu
                           for this particular (other, not current) selection*/
                        other_sc_pulldown = DwtMenuPulldownCreate
                            (parent,"other_sc_pulldown",arglist,argcount);
                        if (AddWidgetToStack(other_sc_pulldown} != 0} return (1);
                                                                 i                    f
(OFXCreateOtherSelectionMenu(other_sc_pulldown,context,formatted_str}
                            continue;
                        argcount = 0;
                        entry_label = DwtLatin1String(formatted_str);
                        SetArg(DwtNsubMenuId,other_sc_pulldown);
                        SetArg(DwtNlabel,entry_label);
                        other_sc_entry = DwtPullDownMenuEntryCreate
                            (parent,"other_sc_entry",arglist,argcount);
                        if (AddWidgetToStack(other_sc_entry) != 0) return (1);
                        XtManageChild(other_sc_entry);
                        if (entry_label) [EtFree (entry_label);
                                          entry_label = (DwtCompString) NULL;}
                        osm_present = 1;
#endif
                    }
                }
            }
        }
        return (0);
)
/*this callback function creates the selection choices menu for a particular
  "other" (not current) context */
long int OFXCreateContextMenu(parent,context,selection)
    Widget parent;
    char* context,*selection;
(
#ifdef DW
    DwtCompString entry_label;
```

```
     #endif
       OFTLTagLibraryPtr cntxt_lib = (OFTLTagLibrraryPtr) NULL;
       OFTLTagPtr tag = (OFTLTagPtr) NULL;
       OFFLValuePtr value = (OFTLValuePtr) NULL;
 5     char* nickname = (char*) NULL;
       long int n_values;
       char* entry_name = (char*) NULL;
       Widget button,sep1,sep2;
       long int argcount = 0;
10     Arg arglist[4];

/* create the context button, non selectable */
       entry_name = (char*) calloc(strlen(context) + 9 +1,sizeof(char));
       sprintf(entry_name,"Context: %s",context);
     #ifdef DW
15     entry_label = DwtLatin1String(entry_name);
       argcount = 0; SetARg(DwtNsensitive,FALSE);
       SetArg(DwtNlabel,entry_label);
       button = DwtPushButtonCreate(parent,context,arglist,argcount);
       if (AddWidgetToStack(button) != 0) return (1);
20     XtManageChild(button);
       sep1 = DwtSeparatorCreate(parent,"sep1",NULL,0);
       if (AddWidgetToStack(sep1) != 0) return (1);
       XtManageChild(sep1);
     #endif
25   #ifdef DW
       if (entry_label) {XtFree(entry_label); entry_label = (DwtCompString) NULL;}
     #endif
       if (entry_name) {cfree(entry_name); entry_name = (char*) NULL;}
       /* create the selection button, non selectable */
30     if (!selection || (selection && (strcmp(selection,"") = 0)))
          {
             entry_name = (char*) calloc(strlen("")+1 + 11,sizeof(char));
             sprintf(entry_name,"Selection: %s","");
          }
35     else
          {
             entry_name = (char*) calloc(strlen(selection) + 13 + 1,sizeof(char));
             sprintf(entry_name,"Selection: \"%s\"",selection);
          }
40   #ifdef DW
       entry_label = DwtLatin1String(entry_name);
       argcount = 0;
       SetArg(DwtNlabel,entry label);
       SetArg(DwtNsensitive,FALSE);
45     button = DwtPushButtonCreate(parent,selection,arglist,argcount);
       if (AddWidgetToStack(button) != 0) return {1};
       XtManageChild(button);
       sep2 = DwtSeparatorCreate(parent,"sep2",NULL,0);
       if (AddWidgetToStack(sep2) != 0) return (1);
50     XtManageChild(sep2);
     #endif
       /* fetch the context structure */
       if (OFXFetchContextByName(context,&cntxt_lib) != 0) return(1);
       /* get the appropriate pastebuffer for this context */
55     /* this is a hack. redo later */
```

```
          cntxt_lib -> un_ptr = 11; /* default */
          if (OFTLFetchTagByName("pasteto",cntxt_lib,&tag) = 0)
             if (OFTLGetNumberOfValues(tag,&n_values) == 0)
                if (n_values > 0)
                {
                   if (OFTLGetNthValue(tag,1,&value) = 0)
                     {
                        if (OFTLGetValueNickName(value,&nickname) = 0)
                           cntxt_lib -> un_ptr = atol(nickname);
                     }
                }
          if (OFXMakeSelectionChoices(parent,cntxt_lib,selection) != 0)
             return (1);
          if (nickname) (cfree(nickname); nickname = (char*) NULL;)
   #ifdef DW
          if (entry_label) {XtFree(entry_label); entry_label = (DwtCompString) NULL;}
   #endif
          if (entry_name) {ofree(entry_name); entry_name = (char*) NULL;}
          return (0);
       }
       XtCallbackProc EditCB(w,t,ob}
             Widget w;

#ifdef DW
             long int t;
             DwtAnyCallbackStruct *cb;
   #endif {
          char* tl_file = (char*) NULL;
          char* p_editor = (char*) NULL;
          char* edit_cmd = (char*) NULL;

tl_file = (char*) t;
          if ((p_editor = (char*) OFSEnvGetPersonalEditor()) = (char*) NULL)
             return;
   #ifdef ULTRIX
          edit_cmd = (char*) calloc(strlen(p_editor)+strlen (tl_file)+2+1,sizeof(char));
          sprintf(edit_cmd,"%s %s&",p_editor,tl_file);
          if (system(edit_cmd) = 127)
             {
                fprintf(stderr, "Unable to invoke editor. \n");
                cfree(edit_cmd);
                return ;
             }
   #endif
   #ifdef VMS
          edit_cmd = (char*) calloc(strlen(p_editor)+strlen(tl_file)+1+24,
                                    sizeof(char));
          springf(edit_cmd,"%s %s",p_editor,tl_file);
          /*printf("Editor command is %s\n",edit_cmd);*/
          if (system(edit_cmd) != SSS_NORMAL)
             {
                cfree(edit_cmd);
                return;
             }
```

```
            #endif
              cfree(edit_cmd);
              return ;
            )
 5          long int OFXCreateOtherContextsList(parent,context,selection)
                  Widget parent;
                  char* context,*selection;
            (
              OFTLTagLibraryPtr temp_cntxt = (OFTLTagLibraryPtr) NULL;
10            OFTLTagLibaryPtr dup_cntxt = (OFTLTagLibraryPtr) NULL;
              OFTLTagPtr tag = (OFTLTagPtr) NULL;
              Widget other_context_entry,other_context_pulldown;
              char* cntxt_name = (char*) NULL;
              char* dup_ cntxt_name = (char*) NULL;
15            long int n_values;argcount = 0;
              Arg arglist[5];

/* reset the other contexts boolean. 12/16/91 jg */
              oc_present = FALSE;
              /* check for the case of null selection and return 0 11/12/91 jg */
20            temp_cntxt = cntxts_list;
              while (temp_cntxt != (OFTLTagLibraryPtr) NULL)
                  {
                    if (cntxt_name != (char*) NULL)
                       {cfree(cntxt_name); cntxt_name = (char*) NULL;)
25                  if (OFXGetContextName(temp_cntxt,&cntxt_name) != 0)
                       {
                         temp_cntxt = temp_cntxt -> next;
                         continue;
                       }
30                  if (strcmp(context,cntxt_name) = 0}
                       {
                         temp_cntxt = temp_cntxt -> next;
                         continue;
                       }
35                  else
                       {
                         /* check for duplicate other contexts, starting from
                             the first and till jsut before the current context */
                         dup_cntxt = cntxts_list;
40                       while (dup_cntxt != (OFTLTagLibraryPtr) temp_cntxt)
                             {
                               if (dup_cntxt_name != (char*) NULL)
                                  {cfree(dup_cntxt_name); dup_cntxt_name = (char*) NULL;)
                               if (OFXGetContextName(dup_cntxt,&dup_cntxt_name) != 0)
45                                {
                                    dup_cntxt - dup_cntxt -> next;
                                    continue;
                                  }
                               /* if the current other context has already been seen,
50                                break out of loop */
                               /* cntxt_name => name of temp_cntxt */
                               if ((dup_cntxt_name != (char*) NULL) &&
                                   (strcmp(cntxt_name,dup_cntxt_name) = 0))
                                 break;
```

```
                    dup_cntxt = dup_cntxt -> next;
                }
        /* current other context has already been seen. skip over it,
            and go to the top of the while loop (outer) */
        /* dup_cntxt has a different ptr value than temp_cntxt
            but both have same context name */
        /* this entire thing for detecting duplicate other contexts
            is a gross back. Rewrite ASAP jg 11/11/91 */
        if (dup_cntxt != (OFTLTagLibraryPtr) temp_cntxt)
        {
            /* free the allocated memory for dup_context jg 11/08/91 */
            if (dup_cntxt_name != (char*) NULL)
                {cfree(dup_cntxt_name); dup_cntxt_name = (char*) NULL;}
            temp_cntxt = temp_cntxt -> next;
            continue;
        }
        /* get the tag structure by name for the resource arg. selection */
        if ((OFXRefreshContext(&temp_cntxt) != 0) ||
            (OFTLFetchTagByName(selection,temp_cntxt,&tag) != 0))
        {
            temp_cntxt = temp_cntxt -> next;
            continue;
        }
        /* get the number of values for this tag */
        if (OFTLGetNumberOfValues(tag,&n_values) != 0)
        {
            temp_cntxt = temp_cntxt -> next;
            continue;
        }
        if (n_values > 0)
        {
#ifdef DW
            /* This pulldown will contain the choices submenu
                for this particular (other, no current) context*/
            /* possible memory leak due to undestroyed and unused
                pull downs here. 12/16/91 jg */
            other_context_pulldown = DwtMenuPulldownCreate
                (parent,"other_context_pulldown",NULL,0);
            if (AddWidgetToStack(other_context_pulldown) != 0) return (1);
            if (OFXCreateContextMenu(other_context_puldown,
                                        cntxt_name,selection) != 0)
            {
                temp_cntxt = temp_cntxt -> next;
                continue;
            }
            oc_present = TRUE;
            argcount = 0;
            SetArg(DwtNsubMenuId,other_context_pulldown);
            other_context_entry = DwtPullDownMenuEntryCreate
                (parent,cntxt_name,arglist,argcount);
            if (AddWidgetToStack(other_context_entry) != 0) return (1);
            XtManageChild(other_context_entry);
#endif
        }
        temp_cntxt = temp_cntxt -> next;
    }
```

```
      }
      if (cntxt_name) (cfree(cntxt_name); cntxt_name = (char*) NULL;)
      return (0);
    }
 5  long int OFXCreateCurrentContextMenu(parent,context,selection)
         Widget parent;
         char* context,*selection;
    {
       char* entry_name = (char*) NULL;
10     char* editor = (char*) NULL;
       Arg arglist[4];
       long int argcount = 0;
       Widget context_entry,context_pulldown,edit_button,sep1 = (Widget) NULL;
    #ifdef DW
15     DwtCompString entry_label;

/* This is the pull down that will contain a submenu of other contexts*/ context_pulldown = DwtMenuPulldownCreate(parent,"context_pulldown",arglist,
                                                          argcount);

/* create a button for invoking personal editor, if corresponding env set */
20     if (
           ((editor = (char*) OFSEnvGetPersonalEditor()) != (char*) NULL) &&
           (strcmp(editor,"") != 0) &&
           (cc_file != (char*) NULL))
         {
25         edit_button = DwtPushButtonCreate(context_pulldown,
                                              "Edit Current Library...",NULL,0);
           XtAddCallback(edit_button,DwtNactivateCallback,EditCB,
                         (XtPointer) cc_file);
           if (AddWidgetToStack(edit_button) != 0) return (1);
30         XtManageChild(edit_button);
           sep1 = DwtSeparatorCreate(context_pulldown,"sep1",NULL,0);
           if (AddWidgetToStack(sep1) != 0) return (1);
           /*XtManageChild(sep1);*/
         }
35     if (AddWidgetToStack(context_pulldown) != 0) return (1);
       if (OFXCreateOtherContextsList(context_pulldown,context,selection) != 0)
         return (1);

if ((oc_present) && (sep1))
          XtManageChild(sep1);
40     /* This is the pull down that will contain a submenu of other selections*/ selection_pulldown = DwtMenuPulldownCreate(parent,"selection_pulldown",
                                                     arglist,argcount);
       if (AddWidgetToStack(selection_pulldown) != 0) return (1);
       if (OFXCreateOtherSelectionList(selection_pulldown,context,selection) != 0)
45       return (1);
    #endif
       entry_name = (char*) calloc(strlen(context) + 9 + 1,sizeof(char));
       sprintf(entry_name,"Context: %s",context);
       /* create the "context" pulldown entry for the current menu */
50   #ifdef DW
       /* Create a pulldown entry/cascade button for the context information */
```

```
        argcount = 0;
        entry_label - DwtLatin1String(entry_name);
        SetArg(DwtNsubMenuId,context_pulldown);
        SetArg(DwtNlabel,entry_label);
        /*SetArg(DwtNsensitive,FALSE);*/
        context_entry = DwtPullDownMenuEntryCreate(parent,context,arglist,argcount);
        if (AddWidgetToStack(context_entry) != 0) return (1);
        XtManageChild(context_entry);
        sep1 = DwtSeparatorCreate(parent,"sep1",NULL,0);
        if (AddWidgetToStack(sep1) != 0) return (1);
        XtManagechild(sep1);
#endif
ifdef DW
        if (entry_label) {XtFree(entry_label); entry_label = (DwtCompString) NULL;}
#endif
        if (entry_name) {cfree(entry_name); entry_name = (char*) NULL;}
        if (!selection || (selection && (strcmp(selection,"") = 0)))
          {
            entry_name = (char*) calloc(strlen("")+1 + 11,sizeof(char));
            sprintf(entry_name,"Selection: %s","") ;
          }
        else
          {
            entry_name = (char*) calloc(strlen(selection) + 13 + 1,sizeof(char));
            sprintf(entry_name,"Selection: \%s\"",selection);
          }
/* create the "selection" pulldown entry for the current menu */
*ifdef DW
        /* Create a pulldown entry/cascade button for the selection information */
        argcount = 0;
        entry_label = DwtLatin1String(entry_name);
        SetArg(DwtNsubMenuId,selection_pulldown);
        SetArt(DwtNlabel,entry_label);
        /*SetArt(DwtNsensitive,FALSE);*/
        selection_entry = DwtPullDownMenuEntryCreate(parent,selection,arglist,
                                                                  argcount);
        if (AddWidgetToStack(selection_entry) != 0) return (1);
        XtManageChild(selection_entry);
#endif
ifdef DW
        if (entry_label) (XtFree(entry_label); entry_label = (DwtCompString) NULL;)
#endif
        if (entry_name) (cfree(entry_name); entry_name = (char*) NULL;)
        return (0);
}
#ifdef DW
void AcclQuitProc(w,t,cb)
      Widget w;
      long int t;
      DwtAnyCallbackStruct *cb;
{
  exit (0);

}
endif
ifdef DW
```

```
        long int OFXMakeQuitButton(popup)
                Widget popup;
        {
          Widget q_button
  5       Arg arglist[4];
          long int argcount = 0;
          DwtCallback QuitCB[2];

QuitCB[0].proc = (VoidProc) AcclQuiteProc;
          QuitCB[0].tag = 0;
 10       QuitCB[1].prog = (VoidProc) NULL; QuitCB[1].tag = 0;
          SetArt(DwtNactivateCallback,QuitCB);
          q_button = DwtPushButtonCreate(popup,"Quit",arglist,argcount);
          XtManageChild(q_button);
          if (AddWidgetToStack(q_button) != 0) return {1};
 15       return (0);
        }
        #endif long int OFXGetClientHelp(cmd_string,all_selections,argc,argv)
                char* cmd_string,* all_selections[];
 20             long int argc;
                char** argv;
        {
          OFTLTagLibraryPtr cntxt_lib = (OFTLTagLibraryPtr) NULL;
          OFTLTagPtr tag = (OFTLTagPtr) NULL;
 25       OFTLValuePtr value = (OFTLValuePtr) NULL;
          Widget sep1;
          char* context = (char*) NULL;
          cahr* nickname = (char*) NULL;
          char* selection = (char*) NULL;
 30       char* formatted_selection = (char*) NULL;
          long int n_values;

/* check to see if the directory of contexts changed */
          if (OFXReadCntxtLibraries() != 0) return (1);
          /* check to see if any individual context files changed */
 35       if (OFXGetCmdStringContext(cmd_string,&ontxt_lib) = 0}
             if (OFXRefreshContext(&cntxt_lib) != 0) return (1);

/* NOW, get the appropriate selection.  Default selection is primary */
          selection = all_selections[0];
          /* get the appropriate select buffer's contents for this cad_string
 40          from among all the buffers and override the default selection */
          if (OFXGetCmdStringSelectionValues(cmd_string,"selectfrom",&tag,
                                                       &n_values) = 0)
             {
               if (n_values > 0)
 45            {
                 if {OFTLGetNthValue(tag,1,&value) = 0)
                   {
                     if (OFTGetValueNickName(value,&nickname) = 0)
                         selection = all_selections[atol(nickname)];
 50                }
               }
             }
```

```
        if (nickname) {cfree(nickname); nickname = (char*) NULL;}
        /* default buffer to paste to is the clipboard */
        paste_ret = 11;
        /* get the appropriate pastebuffer for this cmd_string from all
           the buffers and override the default paste buffer*/
        if (OFXGetCmdStringSelectionValues(cmd_string,"pasteto",&tag,
                                                      &n_values) = 0)
        {
            if (n_values > 0)
            {
                if (OFTLGetNthValue(tag,1,&value) = 0)
                {
                    if (OFTLGetValueNickName(value;&nickname) = 0)
                        paste_ret = atol(nickname);
                }
            }
        }
        if (nickname) (cfree(nickname); nickname = (char*) NULL;}

/* create the application top level shell */
        if (OFXCreateTopLevel(argo,argv) != 0) return (1);

/* create the user pop up menu without its children */
        if (OFXMakeUserPopupMenu(toplevel) != 0)
          return (1);
        /* format the selection string */
        if (selection)
            if (format_string(selection,&formatted_selection) != 0)
                return (1);

/* create the choices menu for the following :
            current selection , current context
            current selection other valid contexts
            other (non null) selections, current context
            other (non null) selections, other valid contexts */
        if (OFXGetCmdStringContext(cmd_string,&cntxt_lib) = 0)
        {
            cc_file = cntxt_lib -> file_name; /* get a ptr to current t1 file */
            cntxt_lib -> ud_ptr = paste_ret;
            if (OFXGetContextName(cntxt_lib,&context) = 0)
            {
                /* put up the context and the selection buttons + other stuff...*/
                if (OFXCreateCurrentContextMenu(popup,context,
                                                      formatted_selection) != 0)
                    return (1);
#ifdef DW
                sep1 = DwtSeparatorCreate(popup,"sep1",NULL,0);
#endif
                if (AddWidgetToStack(sep1) != 0) return (1);

if (OFXMakeSelectionChoices(popup,cntxt_lib,
                                                      formatted_selection) != 0)
                    return (1);
                if (ccm_present)    XtManageChild(sep1);
            }
        }
```

```
        else
            {
            cc_file = (char*) NULL;
            if (OFXCreateCurrentContextMenu(popup,cmd_string,
                                                formatted_selection) != 0)
                return (1);
            }
        /* send the event to wake up the pop up */
#ifdef DW
        if (OFXSendBtnPressEvent(toplevel,Button2) != 0)
            return (1);
#endif
        if (context)
            (cfree(context); context = (char*) NULL;)
        if (formatted_selection)
            (cfree(formatted_selection); formatted_selection = (char*) NULL;)
        return(0);
    }
    long int OFXHandleSelection(buffer,argc,argv)
            char* buffer[];
            long int argc;
            char** argv;
    {
        if (cmd_strong_ret)
            {
            if (OFXGetClientHelp(cmd_string_ret[0],buffer,argc,argv) != 0)
                return (1);
            return (0);
            }
        if (title)
            {
            if (OFXGetClientHelp(title,buffer,argc,argv) != 0)
                return (1);
            return (0);
            }
        return (0);
    }
    /* Perform accelerator related initializations */ long int  OFXInitAccl(button,mask)
            unsigned int button,mask;
    {
      Screen *screen;
      XSetWindowAttributes xswa;

screen = XDefaultScreenOfDisplay(display);
      xswa.event_mask = ButtonPressMask | PropertyChangeMask | KeyPressMask;
      xswa.background_pixel = XBlackPixelOfScreen(screen);
      window = XCreateWindow(display,XDefaultRootWindow(display),10,10,40,40,0
                             XDefaultDepthOfScreen(screen),InputOutput,
                             XDefaultVisualOfScreen(screen),
                             CWEventMask | CWBackPixel,&xswa);

__OFXACCL_PRIV_ZERO = XInternAtom(display,"__OFXACCL_PRIV_ZERO",False);
      __OFXACCL_PRIV_ONE  = XInternAtom(display,"__OFXACCL_PRIV_One",False);
      __OFXACCL_PRIV_TWO  = XInternAtom(display,"__OFXACCL_PRIV_TWO",False);
```

```
        __ACCLENVDIR = XInternAtom(display,"__ACCLENVDIR",False);
        __ACCLENVRECEIVE = XInternAtom(display,"__ACCLENVRECEIVE",False);
        XSetSelectionOwner(display,__ACCLENVDIR,window,CurrentTime);

XGrabButton(display,button,mask,XDefaultRootWindow(display),TRUE,
 5                  ButtonPressMask | ButtonReleaseMask,GrabModeAsync,GrabModeAsync,
                    None,None);
        return (0);
        }
        /* Perform UI related initializaitons */
10      long int OFXInitUi(argc,argv)
             long int argc:
             char** argv;
        {
           long int argcount = 0;
15         Arg argilst[10];

/* Initialize the Xtoolkit, open the display and crate the toplievel shell*/
           XtToolkitUnitialize();
           app_context = XtCreateApplicationContext();
           display = XtOpenDisplay(app_context,NULL,argv[0],"Accelerator",NULL,0,&argc,argv);
20         if (!dispaly)
             {
               printf("Accl: Sorry.  Please check your display name and restart.\n");
               exit (0);
             }
25         return {0};
        }
        long int OFXCreateTopLevel(argo,argv)
             long int argc;
             char** argv;
30      { long int argcount = 0;
             Arg arglist [10];

/* crate application shell */
             SetArg(XtNargc,argc); SetArg(XTNargv,argv);
35           toplevel = XtAppCreateShell
               (argv[0],"Accl",applicationShellWidgetClass,display,arglist.argcount);

/*get the application's resources */
             XtGetApplicationResources(toplevel,{XtPointer} &options,resources,
                                       XtNumber(resources), (Arg*) NULL,0);
40      #ifdef DW
           argcount = 0;
           SetArg (DwtNx,100);SetArg(DwtNy,200);
           SetArg (DwtNwidth,50);SetArg(DwtNheight,50);
           SetArg (DwtNicnName, "Accl-Help");
45         SetArg (DwtNtitle,"Accl-Help");
           SetArg (DwtNallowShellResize,TRUE);
           SetArg (DwtNmappedWhenManaged,FALSE);
        #endif
           XtSetValues{toplevel,arglist,argcount};
50         if (AddWidgetToStack(toplevel) != 0) return (1);
           /* realize the application shell */
           XtRealizeWidget (toplevel);
```

```
       return (0);
   } int MyErrorHandler(display,error)
       Display* display;
       XErrorEvent* error;
   {
     if ((error -> error_code = BadAccess) &&
         (error -> request_code = X_GrabButton))
         {
       fprintf(stderr,"**********************\n");
       fprintf(stderr,
               "Accl: Sorry.  Accelerator is already running.\n");
       fprintf(stderr,
           "Accl: Please exit Accelerator and then restart.\n");
     else
           XSetErrorHandler(NULL);
       exit (0);
   }
   /* the main program */ long int main(argc,argv)
           long int argc;
           char** argv;
   {
     Window edit_prop_w;
     Atom edit_window_prop;
     ATom msg_atom;
     XClientMessageEvent destroy_self;
     char c;
     long int button,mask = 0;
     long int i = 0;

if  (argc > 1}
         {
         if (({atrcmp(argv[1],"-b") = 0 ||
             (strcmp{argv[1],"-B"0 = 0))
           {
           if (argv[2] ! = (char*) NULL)
              while ((o = argv[2][i]  ! = '\o')
                 {
                 switch(c)
                    {
                    case 's': case 'S': mask = mask | ShiftMask ; break;
                    case 'l': case 'L': mask = mask | LockMask ; break;
                    case 'c': case 'C': mask = mask | ControlMask ; break;
                    case 'm': case 'M': mask = mask | ModlMask ; break;
                    case '1': button = Button1 ; break;
                    case '2': button = Button2 ; break;
                    case '3': button = Button3 ; break;
                    }
                 i++;
                 }
              else
                /* if no value for option is specified, use default */
                {
```

```
                    mask = mask | ControlMask | ShiftMask; button = Button1;
                )
            }
        else
            {
                fprintf(stderr,"Invalid option\n");
                mask = mask | ControlMask | ShiftMask' button = Button1'
            }
        }
    else
        /* if no option is specified then provide Ctrl-Shift-MB1 as default */
        {
            mask = mask | ControlMask | ShiftMask; button = Button1;
        }
    resources[0].resource_name = "bellVolume";
    resources[0].resource_class = "BellVolume";
    resources[0].resource_type = XtRInt;
    resources[0].resource_size = sizeof(int);
    resources[0].resource_resource_offset = 0;
    resources[0].default_type = XtRImmediate;
    resources[0].default_addr = (XtPointer) 50;
    OFXInitUI(argc,argv);
    OFXUInitAccl(button,mask);
    if (OFSEnvInitialize() != 0)
```

```
*************************************************************************
**                                                                      *
**              COPYRIGHT (c) 1990, 1991, 1992 BY                       *
**           DIGITAL EQUIPMENT CORPORATION, MAYNARD, MASS.              *
**                        ALL RIGHTS RESERVED                           *
**                                                                      * include <stdio.h>
ifdef VMS
#include <types.h>
#include <stat.h>
#endif
#ifdef ULTRIX
#include <sys/types.h>
#include <sys/stat.h>
#endif
#include <x-include.h>
#include <accl.h>
#include <acclwindow.h>
#include <taglibrary.h>
#include <callbacks.h>

/*
#ifdef ULTRIX
typedef long XtPointer;
#endif
*/
  Widget popupshell,popup,context_entry,context_pulldown,seletion_entry,
  selection_pulldown,askme,db ;

extern OFTLTagLibraryPtr cntxts_list;
extern int recently_read;
extern Boolean ccm_present;
#ifdef MOTIF
static XmStringCharSet charset = (XmStringCharSet) XmSTRING_DEFAULT_CHARSET;
endif ifdef DW
     DwtCallback Value[2];
     /*DwtCallback DestroyValue[2];*/
endif long int OFXRefreshContext (cntxt_lib)
     OFTLTagLibraryPtr *cntxt_lib;
(
  OFTLTagLibraryPtr temp,m_cntxt = (OFTLTagLibraryPtr) NULL;
  OFTLTagPtr tag = (OFTLTagPtr) NULL;
  OFTLValuePtr value = (OFTLValuePtr) NULL;
  struct stat stat_f ;
  char* file_name = (char*) NULL;
  char* nickname = (char*) NULL;
  char* pattern = (char*) NULL;
  char* cntxt_name = (char*) NULL;
  long int n_Values,ud_ptr; /* contains paste to information
```

```
                                                               for this context */
           int lmt = 0;

if (recently_read) return (0);
           if (*cntxt_lib == (OFTLTagLibraryPtr) NULL) return (1);

5         if (OFTLGetLibraryFileName(*cntxt_lib,&file_name) != 0) return (1);
           if (OFTLGetLibraryName(*cntxt_lib,&cntxt_name) !=0) return (1);
           if (OFTLGetLibraryPattern(*cntxt_lib,&pattern) !=0) return (1);

ud_ptr = (*cntxt_lib) -> ud_ptr;

if ( stat(file_name,&stat_f) != 0)
10           {
               if (nickname) {cfree(nickname); nickname = (char*) NULL;}
               if (file_name) {cfree(file_name); file_name = (char*) NULL;}
               if (cntxt_name) {cfree(cntxt_name); cntxt_name = (char*) NULL;}
               if (pattern) {cfree(pattern); pattern = (char*) NULL;}
15             return (1);
             }
           if (OFTLGetModifiedTime((*cntxt_lib),&lmt) != 0)
             {
               if (nickname) {cfree(nickname); nickname = (char*) NULL;}
20             if (file_name) {cfree(file_name); file_name = (char*) NULL;}
               if (cntxt_name) {cfree(cntxt_name); cntxt_name = (char*) NULL;}
               if (pattern) {cfree(pattern); pattern = (char*) NULL;}
               return (1);
             }
25         if (stat_f.st_mtime > lmt)
             {
               if (OFTLCreateLibrary (cntxt_name,file_name,pattern,&m_cntxt) != 0) return (1);
               if (OFTLReadLibrary(m_cntxt) != 0) return (1);
                          /* get the appropriate pastebuffer for this context */
30             /* this is a hack. redo later */
               m_cntxt -> ud_ptr = 11; /* default */
               if (OFTLFetchTagByName("pasteto",m_cntxt,&tag) = 0)
                   if (OFTLGetNumberOfValues(tag,&n_values) = 0)
                       if (n_values > 0)
35                       {
                           if (OFTLGetNthValue(tag,1,&value) = 0)
                             {
                               if (OFTLGetValueNickName(value,&nickname) = 0)
                                  m_cntxt -> ud_ptr = atol(nickname);
40                           }
                         }
               if (cntxts_list = (*cntxt_lib))
                   {
                      cntxts_list = m_cntxt;
45                    cntxts_list -> next = (*cntxt_lib) -> next;
                   }
           else
             {
                   temp = cntxts_list;
50                 while ((temp != (OFTLTagLibraryPtr) NULL) &&
                          (temp -> next != *cntxt_lib))
                       temp = temp -> next;
```

```
                    temp -> next = m_cntxt;
                    m_cntxt -> next = (*cntxt_lib) -> next;
            }
        if (OFTLFreeLibrary (*cntxt_lib) != 0) return (1);
            *cntxt_lib = (OFTLTagLibraryPtr) NULL;
            *cntxt_lib = m_cntxt;
        }
    if (nickname) {cfree(nickname); nickname = (char*) NULL:)
    if (file_name) {cfree(file_Name); file name = (char*) NULL;}
    if (cntxt_name) {cfree(cntxt_name); cntxt_name = (char*) NULL;)
    if (pattern) (cfree(pattern); pattern = (char*) NULL;)
      return (0);
}
#ifdef DW
char    *os_to_chars (cs)
                DwtCompString   os ;
    {
                DwtCompStringContext    context ;
                char    *result = (char*) NULL;
                char *junk = (char*) NULL;
                long    status1, status2, charset, direction, lang, rend ;
                if (! cs) {
                        return ((char*) NULL) ;
                }
                status1 = DwtInitGetSegment (&context, cs) ;
                if (status1 = DwtSuccess) {
                        status1 = DwtGetNextSegment (&context, &result,
                                            &charset, &direction, &lang, &rend) ;
                        status2 = DwtGetNextSegment (&context, &junk,
                                            &charset, &direction, &lang, &rend) ;
                        if (status1 = DwtSuccess) { if (junk) XtFree (junk) ;
                                return (result) ;
                        }
                }
                if (junk)   XtFree (junk) ;
                if (result) XtFree (result)
                return ((char*) NULL) ;
        }
endif void DestroyCB(w,t,cb)
      Widget w;
#ifdef DW
      long int t;
      DwtAnyCallbackStruck *cb;
#endif
{
   Arg arglist[2];
   long int argcount = 0;
#ifdef DW
   DwtCompString os = (DwtCompString) cs;
#endif
   Char* text = (char*) NULL;
```

```
        #ifdef DW
          SetArg(DwtNlabel,&os); XtGetValues (w,arglist,argcount);
          text = cs_to_chars(cs);
        #endif
 5        printf("Destroy CB for Value button %s\n",text);
          if (text) (cfree(text); text = (char*) NULL:)
          return;
        }
        long int OFXMake SelectionChoices(parent,cntxt_lib,selection)
10              Widget parent;
                OFTLTagLibraryPtr cntxt_lib;
                char* selection;
        {
          OFTLTagPtr tag = (OFTLTagPtr) NULL;
15        OFTLValuePtr value = (OFTLValuePtr) NULL;
          Widget button;
          char* nn_name = (char*) NULL;
          long int n_values,i,argcount = 0;
          Arg arglist[5];
20      #ifdef MOTIF
          XmString entry_label;
        #endif
        #ifdef DW
          DwtCompString entry_label;
25      #endif
          /* reset the boolean. added 12/16/91 jg */
          ccm_present = FALSE;
          if (cntxt_lib != (OFTLTagLibraryPtr) NULL)
             if (OFTLFetchTagByName(selection,cntxt_lib.&tag) = 0)
30             if (OFTLGetNumberOfValues(tag,&n_values) = 0)
                 {
                   if (n_values > 0)
                     {
                       for (i = 1; i <= n_values; i++)
35                       {
                           if (OFTLGetNthValue(tag,i,&value) !- 0) return (1);
                           if (OFTLGetValueNickName(value,&nn_name) != 0)
                             /* check and free nn_name 11/11/91 jg*/
                             return (1);
40                         /* the pasteto buffer info goes here */
                           value -> ud_ptr = cntxt_lib -> ud_ptr;
        #ifdef DW
                           ccm_present = TRUE;
                           Value[0].proc = (VoidProc) ValueCB;
45                         Value[0].tag = (long int) value;
                           Value[1].proc = (VoidProc) NULL;
                           Value[1].tag = (long int) NULL;
                           argcount = 0;
                           entry_label = DwtLatin1String(nn_name);
50                         SetArg(DwtNlabel,entry_label);
                           SetArg(DwtNactivateCallback,Value);
                           /* SetArg(DwtNdestroyCallback,DestroyValue);*/
                           button = DwtPushButtonCreate(parent,nn_name,arglist, argcount);
                           if (AddWidgetToStack(button) != 0) return (1);
55                         XtManageChild(button);
```

```
                            if (entry_label) {XtFree(entry_label);
                                       entry_label = (DwtCompString) NULL;)
                  #endif
                            if (nn_name) {cfree(nn_name); nn_name = (char*) NULL;}
                    }
                }
            return (0);
        }
        /* send a button event to the widget's window */ long int OFXSendBtnPressEvent(w,button)
              Widget w;
              long int button; /* deals with only three buttons for now 1,2,3 */
        {
          Window root_ret,child_ret;
          long int rx_ret,ry_ret,wx_ret,wy_ret;
          unsigned long int mask_ret;
          long int status = 0;
          XButtonEvent event;
        /* get the pointer's x-y relative to root, and event window for sending event*/
          status = XQueryPointer (display,XtWindow(toplevel),&root_ret,&child_ret,
                                  &rx_ret,&ry_ret,&wx_ret,&wy_ret,&mask_ret);
          /*generate a send event to the application in order to wake up pop up */
          event.display = display;
          event.window = XTWindow(toplevel);
          event.type = ButtonPress;
          event.root = XDefaultRootWindow(display);
          event.x_root = rx_ret; event.y_root = ry_ret;
          event.x = wx_ret; event.y = wy_ret;
          event.same_screen = True;
          if (button = Button1)
             {
                event.state = Button1Mask;
                event.button = Button1;
             }
          else
             if (button = Button 2)
                {
                   event.state = Button2Mask
                   event.button = Button2;
                }
          else {event.state = Button3Mask;
                event.button = Button3;
             }
          status = XSendEvent(display,XtWindow(toplevel),FALSE,NULL,&event};
        #ifdef DEBUG
          printf("Window is: 0x%x  Status is 0x%x\n",XtWindow(toplevel),status);
        #endif
          return (0);
        }
        long int OFXSetupTranslations(w,data)
              Widget w;
              long int data;
        {
          char popup_translation_table[64];
```

```
      /*static char popup_move_translation_table[64];*/
      XtActionsRec popup_action_table[1];
      XtTranslations parsed_t_table;

sprintf(popup_translation_table, "<Btn2Down>: wake_popup(%d)",data);
 5    popup_action_table[0].string = "wake_popup";
      popup_action_table [0].proc = (XtActionProc) wake_popup;
      XtAppAddActions (app_context,popup_action_table,1);
      parsed_t_table = XtParseTranslationTable(popup_translation_table);
      XtOverrideTranslations(w,parsed_t_table);
10    return (0);
    }
    /* testing with unmap again 11/12/91 jg */ void OFXUnmapPopup(w,t,cb)
          Widget w;
15  #ifdef DW
          long int t;
          DwtAnyCallbackStruct* cb;
    #endif
    #ifdef MOTIF
20        caddr_t t;
          XmAnyCallbackStruck* cb;
    #endif
    {
       XtIntervalid timer_id;

25  #ifdef DEBUG
       printf("Unmapping popup\n");
    #endif
       ClearStack();
       /*XSync(display,True);*/
30     /*set up a timer to destroy the popup
       timer_id = XtAppAddTimeOut(app_context,5000,DestroywithDelay,
                              (XtPointer)toplevel); */
       return ;
    }

35  long int OFXMakeUserPopupMenu(parent)
          Widget parent;
    {
      long int argcount = 0;
      Arg arglist[10];
40    XWindowAttributes war;
    #ifdef DW
      DwtCallback Unmap[2];
      /* test to see if widgets are being actually destroyed */
    #endif
45    /* get the x,y position of the client's window */
      if (client_source_w)
        XGetWindowAttributes(display,client_source_w,&war);
    #ifdef DW
      /*Create the pop up menu as a child of the top level widget */
50    argcount = 0;
    #ifdef DEBUT
       printf("window pos are X:%d\n y:%d\n",war.x,war.y);
```

```
#endif
  Unmap[0].proc = (VoidProc) OFXUnmapPopup;
  Unmap[0].tag = (long int) 0;
  Unmap[1].proc = (VoidProc) NULL;
  Unmap[1].tag = (long int) NULL;
  SetArg(DwtNunmapCallback,Unmap); /* destroying through unmap 11/12/91 jg */
  SetArg(DwtNx,war.x + (int) (0.5 * war.width));
  SetArg(DwtNy,war.y + (int) (0.5 * war.height));
  SetArg(DwtNsensitive,TRUE);
  popup = DwtMenuPopupCreate(parent,"popup",arglist,argcount);
  if (AddWidgetToStack(popup) != 0) return (1);
#endif
ifdef DW
  /*XtAddEventHandler(db,ButtonPressMask,FALSE,PostIt,popup);*/
  OFXSetupTranslations(parent,(long int) popup);
#endif
  return (0);
}
```

What is claimed is:

1. A method for displaying help information using a help information program to a user of a first application running on a computer having an identifiable active context, said help information program being external to said first application, and a second non-running application, said second application having a non-active context said second application being external to said help information program and said first application, said method comprising the steps of:

identifying said active context corresponding to said first application and identifying said non-active context corresponding to said second application;

identifying a user selection about which help information is sought;

determining whether said user selection corresponds to said active or said non-active context;

constructing a help information menu corresponding to said user selection; and displaying said help information menu to the user without interrupting said first application.

2. A method for displaying help information using a help information program to a user of a first application running on a computer having an identifiable active context, said help information program being external to said first application, and a second non-running application, said second application having a non-active context, said active and said non-active context each having a corresponding context help file, said computer having a plurality of said context help files containing user customized help information for said active and non-active contexts and a directory file containing a mapping between said active and non-active contexts and said plurality of context help files corresponding therewith, said method comprising the steps of:

detecting a user selection;

identifying said active context corresponding to said first application and identifying said non-active context corresponding to said second application;

identifying a user selection about which help information is sought;

determining whether said user selection corresponds to said active or said non-active context and determining which context help file corresponds to said user selection;

constructing a help information menu from said context help file and from said help information corresponding to said user selection; and displaying said help information menu to the user without interrupting said first application.

3. The method as set forth in claim 2, further comprising the step of:

updating said customized help information to incorporate any changes made thereto.

4. The method as set forth in claim 3 wherein said updating step occurs automatically every time a user invocation request is detected.

5. A method for displaying help information to a user of a program having an identifiable active context running on a computer, said help information being external to said program, said help information being associated with a plurality of different contexts, one of said contexts being said active context and other of said contexts being non-active contexts, each of said contexts having a corresponding help file, said computer having a plurality of said context help files containing help information corresponding to said contexts and user customized help information associated therewith and a directory file containing mapping between said plurality of different contexts and said plurality of context help files corresponding therewith, said method comprising the steps of:

(a) identifying said active context in which the user program is operating;

(b) identifying a user selection about which help information is sought;

(c) comparing said active context with a context in said directory file;

(d) if said active context matches said context in said directory file compared in step (c) comparing said user selection to said selections in said context help file corresponding to said context in said directory file compared in step (c)

(e) if said user selection corresponds to a selection in said context help file compared in step (d), constructing a first help information menu based on said active context and said user selection;

(f) if said user selection does not correspond to a selection in said context help file compared in step (d), selecting another one of said contexts in the directory and repeating steps (c) through (f) until each of said plurality of different contexts are compared to said active contexts;

(g) if said active context does not match a context in said directory file, comparing said user selection to selections in said context help files corresponding to non-matching contexts in said directory file;

(h) if said user selection corresponds to selections in context help files corresponding to non-matching contexts, constructing a second help information menu based on said non-matching contexts and said user selection;

(i) displaying said first help information menu without interrupting the program being run by the user.

6. The method of claim 5, further comprising the step of:

(j) displaying said second help information menu without interrupting the program being run by the user.

7. A system for displaying help information on a terminal screen of a user of a first application running on a computer having an active context associated with said first application, said system comprising:

a help information program said program being external to said first application;

a second non-running application said second application being external to said first application and said help information program;

means for identifying said active context corresponding to said first application and identifying said non-active context corresponding to said second application;

a database for storing customized help information based upon said active and said non-active contexts and a plurality of selections, each said active context and said non-active contexts having one or more selections associated therewith;

a processor responsive to said user selection and said active context identity for retrieving from said database customized help information;

a portion of said retrieved customized help information based upon said active context and said user selection and another portion of said retrieved help information based upon said non-active context and said user selection;

means for displaying said retrieved customized help information based upon said active context without interrupting said first application.

8. The system for displaying customized help information as set forth in claim 7, further comprising:

means for displaying said retrieved customized help information based upon said other contexts without having the user identify said other contexts and without interrupting the user application.

* * * * *